United States Patent
Pajak et al.

(10) Patent No.: US 12,054,005 B2
(45) Date of Patent: Aug. 6, 2024

(54) WHEEL AND BRAKE ASSEMBLY WITH MECHANICAL STOP

(71) Applicant: Honeywell International Inc., Charlotte, NC (US)

(72) Inventors: William E Pajak, Chesterton, IN (US); Jonathan T. Beehler, Bremen, IN (US); Brian Berk, South Bend, IN (US); Anthony Scelsi, South Bend, IN (US)

(73) Assignee: Honeywell International Inc., Charlotte, NC (US)

( * ) Notice: Subject to any disclaimer, the term of this patent is extended or adjusted under 35 U.S.C. 154(b) by 792 days.

(21) Appl. No.: 17/248,135

(22) Filed: Jan. 11, 2021

(65) Prior Publication Data

US 2022/0219489 A1    Jul. 14, 2022

(51) Int. Cl.
| | |
|---|---|
| *F16D 55/40* | (2006.01) |
| *B60B 27/00* | (2006.01) |
| *F16D 65/00* | (2006.01) |
| *B64C 25/44* | (2006.01) |
| *F16D 121/04* | (2012.01) |
| *F16D 127/00* | (2012.01) |

(52) U.S. Cl.
CPC .......... *B60B 27/0052* (2013.01); *F16D 55/40* (2013.01); *F16D 65/005* (2013.01); *B64C 25/44* (2013.01); *F16D 2121/04* (2013.01); *F16D 2127/00* (2013.01)

(58) Field of Classification Search
CPC ....... F16F 55/40; F16F 65/005; F16F 2127/00
See application file for complete search history.

(56) References Cited

U.S. PATENT DOCUMENTS

| | | | |
|---|---|---|---|
| 4,878,563 A | 11/1989 | Baden et al. | |
| 5,205,382 A | 4/1993 | Edmisten | |
| 5,542,517 A * | 8/1996 | Peruski | F16H 63/3026 |
| | | | 192/85.25 |
| 5,701,976 A * | 12/1997 | Kumagai | F16D 55/40 |
| | | | 192/85.33 |

(Continued)

FOREIGN PATENT DOCUMENTS

| | | |
|---|---|---|
| EP | 3453614 A1 | 3/2019 |
| GB | 2352784 A | 2/2001 |

OTHER PUBLICATIONS

Extended Search Report from counterpart European Application No. 21218085.5 dated Jun. 3, 2022, 10 pp.

(Continued)

*Primary Examiner* — Xuan Lan Nguyen
(74) *Attorney, Agent, or Firm* — Shumaker & Sieffert, P.A.

(57) ABSTRACT

In some examples, an assembly includes a wheel configured to rotate around an axis and a brake system configured to reduce a rotation of the wheel. The brake system includes a disc stack having a rotor disc rotationally coupled to the wheel and a stator disc, wherein the wheel is configured to rotate relative to the stator disc. The brake system includes an actuator configured to compress the disc stack. The brake system is configured to exert a reaction force on the disc stack when the actuator compresses the disc stack. The assembly includes a mechanical stop configured to encounter the brake system, wherein the mechanical stop is configured to limit a linear displacement between the actuator and the disc stack.

20 Claims, 10 Drawing Sheets

(56) References Cited

U.S. PATENT DOCUMENTS

| | | | |
|---|---|---|---|
| 5,765,673 A * | 6/1998 | Nishiyama | F16D 25/0638 |
| | | | 192/85.41 |
| 5,937,985 A * | 8/1999 | Dover | F16D 55/40 |
| | | | 403/DIG. 7 |
| 6,702,068 B1 | 3/2004 | Riebe | |
| 7,129,658 B2 | 10/2006 | Ether | |
| 7,523,816 B2 | 4/2009 | Tong et al. | |
| 9,548,637 B2 | 1/2017 | Rapp et al. | |
| 10,145,429 B1 * | 12/2018 | Whittle | B64C 25/44 |
| 2002/0020601 A1 * | 2/2002 | Martin | F16D 13/69 |
| | | | 192/70.28 |
| 2006/0163020 A1 * | 7/2006 | Schmidt | F16D 67/04 |
| | | | 192/53.1 |
| 2018/0149216 A1 | 5/2018 | Kirkpatrick | |

OTHER PUBLICATIONS

Response to Extended Search Report dated Jun. 3, 2022, from counterpart European Application No. 21218085.5, filed Jun. 9, 2022, 48 pp.

Communication pursuant to Article 94(3) EPC from counterpart European Application No. 21218085.5 dated Jan. 29, 2024, 6 pp.

Response to Communication pursuant to Article 94(3) EPC dated Jan. 29, 2024, from counterpart European Application No. 21218085.5 filed Mar. 11, 2024, 12 pp.

* cited by examiner

WHEEL AND BRAKE ASSEMBLY WITH MECHANICAL STOP

TECHNICAL FIELD

The present disclosure relates to brake systems of a vehicle.

BACKGROUND

Vehicles, such as aircrafts, may use a wheel brake system that includes a multi-disc brake system. For example, the multi-disc brake system may include a disc stack comprising plurality of rotor discs engaged with a wheel and a plurality of stator discs interleaved with the rotor discs. The rotor discs and wheel are configured to rotate around an axle, while the stator discs remain stationary. To decelerate rotational motion of a rotating wheel, the brake system may displace pistons against a pressure plate to compress the rotating rotor discs engaged with the wheel against the stationary stator discs, therefore producing torque that decelerates the rotational motion of the wheel. In some examples, the rotor discs may be engaged with the wheel via rotor drive keys positioned on an interior surface of the wheel. In some examples, stator discs may be engaged with a stationary torque tube surrounding the axle via splines positioned on the torque tube. In some such examples, the brake system may be configured to compress the rotor discs and the stator discs between the piston and a backing plate supported by the torque tube.

SUMMARY

The present disclosure describes example wheel assemblies configured to help limit a maximum displacement achievable between a piston housing and a brake disc stack when a brake system is utilized to reduce and/or substantially prevent a rotation of a wheel. The brake system is configured to compress a brake disc stack to reduce and/or limit rotational motion of the wheel about the wheel axis. For example, an actuator may be configured to compress the disc stack against a portion of a torque tube engaged with the disc stack. Under some circumstances, the compression force of the actuator may cause a linear deformation of the torque tube. The linear deformation may require additional piston travel to assure the compression force on the disc stack is maintained during certain operating conditions, such as a Rejected Take-Off (RTO) stop. The assembly disclosed here uses a mechanical stop configured to unload some portion of the compression force from the torque tube when the torque tube linearly deforms. The mechanical stop is configured to limit the maximum distance between the actuator housing and the disc stack at end of life, even during compression of the brake disc stack.

In some examples, an assembly comprises a wheel configured to rotate around a wheel axis; a brake system comprising: a disc stack comprising a rotor disc and a stator disc, wherein the rotor disc is rotationally coupled to the wheel, and wherein the wheel is configured to rotate relative to the stator disc; and an actuator defining an actuator housing and configured to compress the disc stack, wherein the brake system is configured to compress the disc stack by limiting the linear movement of the disc stack by exerting a reaction force on the disc stack when the actuator compresses the disc stack, and wherein a portion of the brake system is configured to linearly deform when the brake system exerts the reaction force; and a mechanical stop configured to reduce the reaction force exerted by the brake system when the linear deformation of the portion of the brake system causes the mechanical stop to encounter the brake system, such that the mechanical stop limits a linear displacement of the disc stack relative to the actuator housing.

In some examples, an assembly comprises: a wheel configured to rotate around a wheel axis; a brake system comprising: a disc stack; a torque tube configured to engage the disc stack; a backing plate attached to the torque tube, wherein the backing plate is configured to limit movement of the disc stack in a direction parallel to the wheel axis; and an actuator configured to compress the disc stack against the backing plate using a compression force, wherein the backing plate is configured to exert a reaction force on the disc stack when the actuator compresses the disc stack; and a mechanical stop configured to encounter the disc stack, wherein: the mechanical stop is configured to reduce the reaction force when the mechanical stop encounters the disc stack, the mechanical stop is configured to limit movement of the disc stack in the direction parallel to the wheel axis when the mechanical stop encounters the disc stack, such that the mechanical stop limits a linear displacement of the disc stack relative to the actuator; the actuator defines a first length between the actuator and the mechanical stop in the absence of the compression force, the actuator defines a second length between the actuator and the backing plate in the absence of the compression force, the first and second lengths being measured in a direction parallel to the wheel axis, and the first length is greater than the second length.

An example technique includes compressing a disc stack of a brake system using an actuator of the brake system, wherein the disc stack includes a rotor disc rotationally coupled to a wheel and a stator disc, wherein the wheel is configured to rotate around the stator disc, wherein the brake system exerts a reaction force on the disc stack when the actuator compresses the disc stack; and limiting the movement of the disc stack by reducing the reaction force exerted by the brake system by causing the brake system to encounter a mechanical stop using the compression of the disc stack by the actuator.

The details of one or more examples are set forth in the accompanying drawings and the description below. Other features, objects, and advantages will be apparent from the description and drawings, and from the claims.

DETAILED DESCRIPTION

Figure 1:
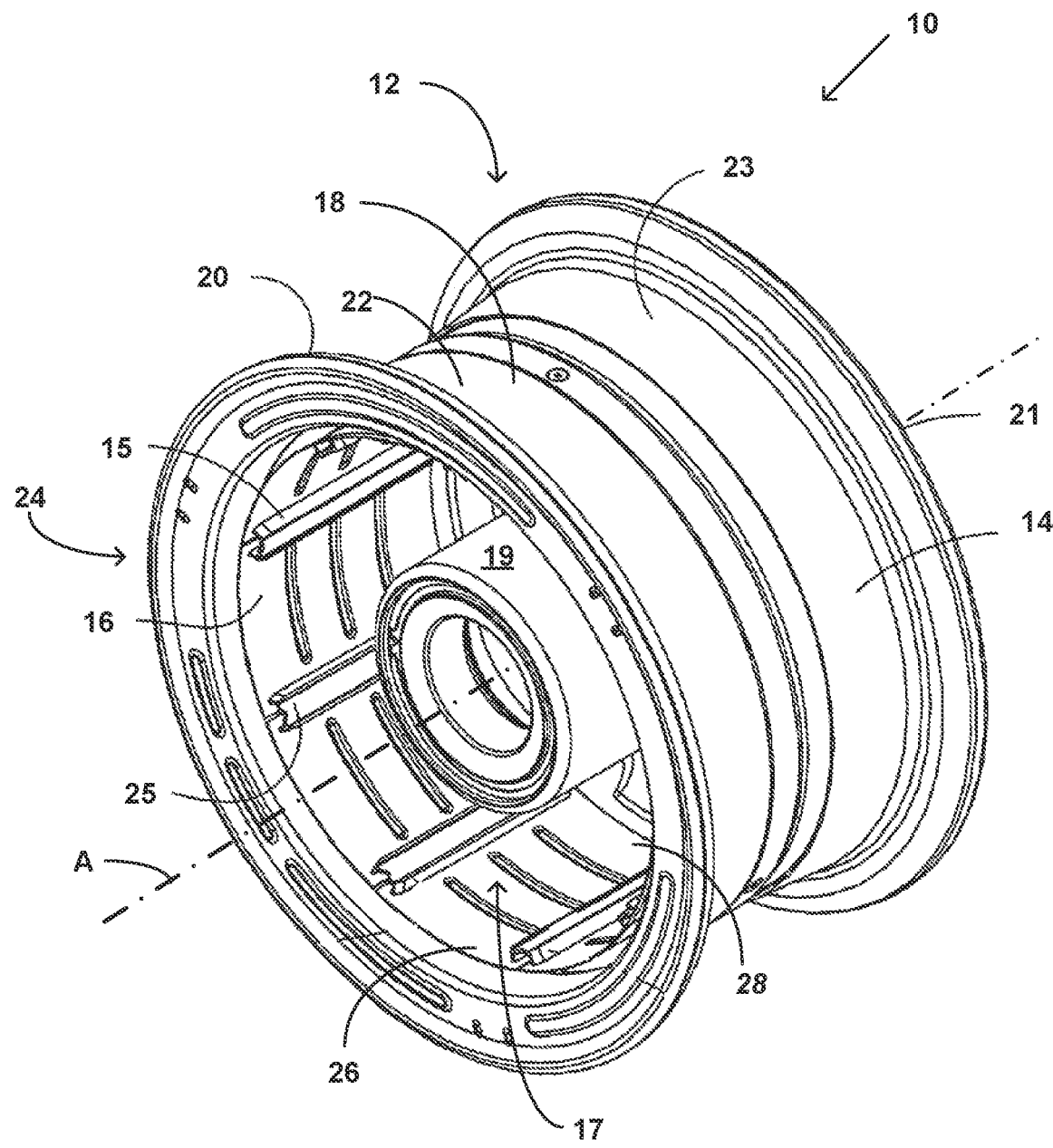
FIG. 1 is a perspective view illustrating an example wheel including a plurality of rotor drive keys on an interior surface of the wheel.

The disclosure describes articles, systems, and techniques relating to an assembly comprising a wheel and a brake system, and, in particular, an assembly including one or more structures configured to limit the axial displacement of the brake discs under certain conditions. The wheel is configured to rotate around a wheel axis. The brake system includes a disc stack which includes one or more rotor discs and one or more stator discs. For example, the disc stack may include a plurality of rotor discs interleaved with a plurality of stator discs. The rotor discs are rotationally coupled with the wheel, such that a rotation of the wheel around the wheel axis causes rotation of the rotor discs around the wheel axis. The stator discs are configured to remain substantially stationary relative to the wheel and the rotor discs. The brake system is configured to compress the disc stack to cause engagement of friction surfaces on the rotating rotor discs and the stationary stator discs, reducing a rotational speed of the rotor discs around the wheel axis. The rotor discs are configured to engage the wheel, such that the reduction in the rotational speed of the rotor discs causes a reduction in the speed of the wheel.

The brake system includes an actuator defining an actuator housing and configured to compress the disc stack to cause the slowing of the rotor discs and wheel. For example, the actuator may be configured to compress the disc stack against a backing plate supported by a torque tube, wherein the backing plate and the torque tube are configured to remain substantially rotationally stationary with respect to the stator discs. The braking system may be configured such that, when the actuator exerts a compression force to compress the disc stack against the backing plate (e.g., to slow the wheel), the backing plate transmits some portion of the compression force to the supporting torque tube. The portion of the compression force transmitted may cause a linear deformation of the torque tube (e.g., in a direction substantially parallel to the axis of the wheel), increasing a displacement between the actuator housing and the disc stack.

The assemblies disclosed herein are configured to help limit the displacement between the actuator housing and the brake disc stack when the actuator exerts the compression force. In examples, the assembly is configured to help limit the displacement when the compression force causes an excessive linear deformation of the torque tube. Hence, the assembly described herein may be configured to reduce and/or minimize additional piston travel that may be required to assure the compression force on the disc stack is maintained during certain operating conditions, such as a Rejected Take-Off (RTO) stop. The assembly may be configured to limit the maximum distance between the piston housing and the disc stack at end of life, even during compression of the brake disc stack.

The assemblies described herein include a mechanical stop configured to transfer load from the torque tube when the compression force of the actuator causes linear deformation of the torque tube. The mechanical stop may be configured to unload the torque tube in order to limit a displacement (e.g., a maximum distance) between the actuator housing and the brake disc stack. In some examples, the assembly is configured such that the actuator compresses the disc stack against the mechanical stop when the mechanical stop unloads the torque tube. For example, in some examples, the assembly is configured such that the brake system compresses the disc stack against a backing plate until the torque tube experiences a certain amount of linear deformation, at which point the mechanical stop encounters the disc stack to at least partially unload the backing plate and torque tube. In examples, the assembly is configured to reduce and/or substantially cease the linear deformation of the torque tube when the mechanical stop transfers load from the torque tube. In other examples, the mechanical stop is configured to limit or even prevent movement of the backing plate of the brake system in an axial direction (resulting from linear deformation of the torque tube), and the actuator continues to be configured to compress the disc stack against the backing plate even after the torque tube experiences a certain amount of linear deformation.

The assembly may allow a reduction in the amount of reserve actuator capacity (e.g., piston travel) typically provided for situations when the torque tube experiences larger linear deformations (e.g., in high heat environments following, for example, emergency braking events or other relatively high energy vehicle stopping conditions). The assembly may be configured to reduce a required stroke length of the actuator necessary to effectively engage the brake system (e.g., during a static hold of the vehicle by the brake system when the vehicle is parked) when the torque tube experiences the higher linear deformations. By reducing and/or substantially ceasing the linear deformation, the assembly may allow reducing the required stroke length of the actuator. This may result in some measure of space saving when the brake system is positioned within a wheel well of the wheel. Further, by reducing the required stroke, additional brake disc thickness may be added to unused spaces, increasing the amount of wearable brake disc thickness and potentially increasing the life of the brake assembly.

In some examples, the wheel supports the mechanical stop. In examples, the wheel supports the mechanical stop such that, when the actuator compresses the disc stack against the mechanical stop, the mechanical stop transmits a portion (e.g., substantially all) of the compression force to the wheel. Transmission of the compression force to the wheel reduces (or substantially eliminates) the amount of the compression force acting on the torque tube, reducing (or substantially eliminating) any further linear deformation of the torque tube and associated brake disc stack translation. In examples, the mechanical stop is configured to limit a maximum displacement which may occur between an actuator housing and the brake disc stack when the mechanical stop encounters the disc stack.

The assembly may be configured such that a linear deformation of the torque tube (e.g., by exertion of the compression force by the actuator) greater than or equal to a threshold linear deformation causes the mechanical stop to encounter the disc stack. The assembly may be configured such a first linear deformation of the torque tube maintains a displacement between the mechanical stop and the disc stack, and a second linear deformation of the torque tube greater than the first linear deformation causes the mechanical stop to contact the disc stack. The first linear deformation and the second linear deformation may each be a deformation in a direction substantially parallel to the axis of the wheel. In examples, the torque tube is configured such that the actuator causes the first linear deformation under a first heat load and causes the second linear deformation under a second heat load greater than the first heat load. The heat load may be defined by, for example, a temperature at one or more points of the torque tube, a temperature of another component in the wheel and brake system, a temperature within the wheel well of the wheel, or some other suitable parameter. In examples, the torque tube may have a configuration (e.g., may comprise a material and/or a geometry) causing the torque tube to experience a greater degree of linear deformation under a given heat load than other components of the brake system and/or wheel. For example, the torque tube may be relatively thin compared to a rotor drive key or other component of the brake system, which may result in relatively higher temperatures of the torque tube for a given thermal environment (e.g., the thermal environment following an emergency stop.)

Hence, the assembly may be configured such that the mechanical stop encounters the disc stack depending on a state of the torque tube. For example, the assembly may be configured such that, at relatively low heat loads, the compression force of the actuator is insufficient to generate a linear deformation of the torque tube necessary to cause the mechanical stop to encounter the disc stack (i.e., the linear deformation is less than the second linear deformation described above). Thus, the assembly may be configured to effectively operate under certain conditions wherein braking of the wheel is accomplished without transferring compression load from the torque tube to the mechanical stop. The assembly may be configured such that, at sufficiently high heat loads (e.g., following an emergency stop), the compression force of the actuator may generate a linear deformation of the torque tube sufficient to cause the mechanical stop to encounter the disc stack (i.e., the second linear deformation).

In examples, the actuator defines a first length between a portion of the actuator and the mechanical stop in the absence of the compression force. The actuator may define a second length between the portion of the actuator and a backing plate in the absence of the compression force. The first length may be greater than the second length. The first and second lengths may be measured in parallel directions, e.g., along a wheel axis of the wheel to which the brake assembly is attached. The portion of the actuator may be, for example, a contact area through which the actuator is configured to exert the compression force on the disc stack.

In some examples, the mechanical stop is rotationally coupled to the wheel. The mechanical stop may be configured to rotate with the wheel and configured to encounter a portion of the brake system which also rotates with the wheel (e.g., a rotor disc) in order to limit and/or avoid contact between rotating and relatively stationary portions of the system. For example, the mechanical stop may be configured to rotate substantially synchronously around the wheel axis when the wheel rotates around the wheel axis. In some examples, a pin engaged with the wheel defines the mechanical stop. In some examples, an interior surface of the wheel includes a ledge defining the mechanical stop. In yet other examples, a rotor drive key attached to the wheel and configured to engage a rotor disc defines the mechanical stop. The mechanical stop may be configured to encounter some portion of the disc stack rotationally coupled with the wheel. The mechanical stop may be configured to encounter a rotor disc or a rotor disc component (e.g., a drive insert) configured to rotate synchronously with the rotor disc. In examples, when the actuator is configured to compress the disc stack against the backing plate, the mechanical stop is configured to encounter a rotor disc adjacent to or nearest the backing plate.

FIG. 1 is a perspective view illustrating an example wheel 10. In some examples, wheel 10 is a part of an aircraft vehicle. In other examples, wheel 10 may be a part of any other vehicle, such as, for example, any land vehicle or other vehicle. In the example shown in FIG. 1, wheel 10 includes a wheel rim 12 defining an exterior surface 14 and interior surface 16. Wheel rim 12 includes tubewell 18 and wheel hub 19. In some examples, interior surface 16 may include an inner diameter of tubewell 18 of wheel 10. For example, in some cases, interior surface 16 may be referred to as an inner diameter surface of wheel 10. Interior surface 16 and wheel hub 19 may define a wheel well 17 (e.g., a volume) between interior surface 16 and wheel hub 19. In some examples, a tire (not shown) may be mounted on exterior surface 14 of rim 12. Wheel 10 may include an inboard bead seat 20 and an outboard bead seat 21 configured to retain a tire on exterior surface 14 of rim 12. In examples, wheel 10 may comprise an inboard section 22 (e.g., including inboard bead seat 20) and an outboard section 23 (e.g., including outboard bead seat 21). Wheel 10 is configured to rotate around the axis of rotation A.

Wheel 10 includes a plurality of rotor drive keys 24 on interior surface 16 of wheel 10, such as rotor drive key 25 and rotor drive key 15. In some examples, each rotor drive key of the plurality of rotor drive keys 24 extends in a substantially axial direction of wheel 10 (e.g., in a direction parallel to the axis of rotation A). The plurality of rotor drive keys 24 ("rotor drive keys 24") and interior surface 16 are configured to be substantially stationary with respect to each other, such that when wheel 10 (and interior surface 16) rotates around axis of rotation A, each of the rotor drive keys (e.g., rotor drive keys 15, 25) translates over a closed path around axis A. Consequently, when wheel 10, interior surface 16, and rotor drive keys 24 are rotating around axis of rotation A, a force on one or more of rotor drive keys 24 opposing the direction of rotation acts to slow or cease the rotation. As will be discussed, rotor drive keys 24 may be configured to receive a torque from a braking system (not shown) configured to reduce and/or cease a rotation of wheel 10. Rotor drive keys 24 may be integrally formed with interior surface 16, or may be separate from and mechanically affixed to interior surface 16.

Figure 2:
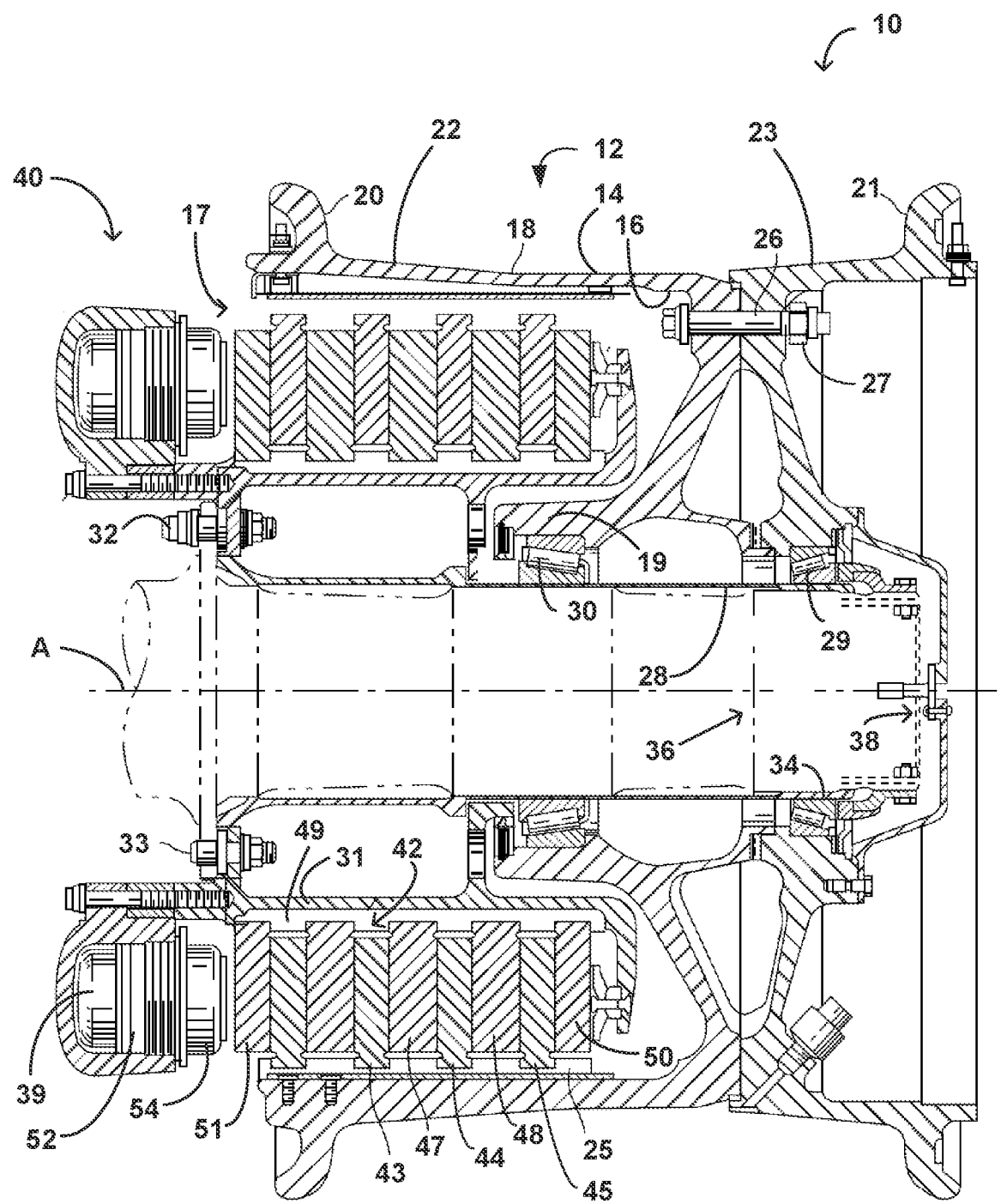
FIG. 2 is a schematic cross-sectional view illustrating an example wheel and brake system including the wheel of FIG. 1.

FIG. 2 is a schematic cross-sectional view illustrating wheel 10 and an example brake system 40. Wheel 10 includes wheel rim 12, exterior surface 14, interior surface 16, wheel well 17, wheel hub 19, inboard beat seat 20, outboard bead seat 21, inboard section 22, outboard section 23, and rotor drive key 25. FIG. 2 illustrates wheel rim 12 as a split rim wheel with lug bolt 26 and lug nut 27 connecting inboard section 22 and outboard section 23, however wheel rim 12 may utilize other configurations (e.g., a unified wheel rim) in other examples.

Wheel 10 is configured to rotate about axis A extending through axial assembly 28. Axial assembly 28 is figured to support wheel 10 while allowing wheel 10 to rotate around axis A using bearing 29 and bearing 30. For example, bearings 29, 30 may define a substantially circular track around axial assembly 28. A torque tube 31 is coupled to axial assembly 28 (e.g., via bolts 32, 33), such that torque tube 31 remains substantially stationary when wheel 10 rotates around axial assembly 28 and axis A. Torque tube 31 may at least partially surround an exterior of axial assembly 28. Axial assembly 28 may be mechanically coupled to a strut attached to a vehicle (e.g., a landing gear strut (not shown)).

Brake system 40 may be positioned within wheel 10 and configured to engage main torque tube 31 and rotor drive key 25. Brake system 40 is configured to generate a torque to oppose a rotation of wheel 10 around axis A and transfer the torque to rotor drive key 25, reducing and/or eliminating the rotation of wheel 10 around axis A. Brake system 40 includes a disc stack 42 which includes one or more rotor discs (e.g., rotor discs 43, 44, 45) and one or more stator discs (e.g., stator discs 47, 48). Rotor discs 43, 44, 45 and/or stator discs 47, 48 may have any suitable configuration. For example, rotor discs 43, 44, 45 and/or stator discs 47, 48 can each be substantially annular discs surrounding axial assembly 28. Stator discs 47, 48 are coupled to torque tube 31 via spline 49 and remain rotationally stationary with torque tube 31 (and axial assembly 28) as wheel 10 rotates. Rotor discs 43, 44, 45 are rotationally coupled to rotor drive key 25 and interior surface 16 and rotate substantially synchronously with wheel 10 around axis A.

An actuator 39 is configured to compress disc stack 42 to bring friction surfaces of rotor discs 43, 44, 45 into contact with friction surfaces of stator discs 47, 48 generating shearing forces between the discs. A friction surface of a rotor disc and/or stator disc may also be brought into contact with a friction surface of pressure plate 51 or a friction surface of backing plate 50. The shearing forces cause rotor discs 43, 44, 45 to exert a torque on rotor drive key 25 opposing a rotation of wheel 10. In some examples, actuator 39 is configured to compress disc stack 42 using a pressure plate 51. In these examples, actuator 39 may be configured to cause pressure plate 51 to translate toward disc stack 42 when actuator 39 compresses disc stack 42. In examples, actuator 39 is configured to cause a piston 54 to translate relative to a body 52 of actuator 39 ("actuator body 52") to exert to compress disc stack 42. Actuator 39 may cause piston 54 to translate using any suitable method. In some examples, actuator 39 is configured to cause translation of piston 54 by supplying and/or venting a pressurized hydraulic fluid to or from a piston chamber. In addition or instead, in some examples, actuator 39 is configured to cause piston 54 to translate through a motion (e.g., a rotary motion) generated by an electric motor.

In the example shown in FIG. 2, actuator 39 is configured to compress disc stack 42 against a backing plate 50. Backing plate 50 may be supported by torque tube 31. For example, backing plate 50 may be configured to be substantially stationary with respect to torque tube 31. Wheel 10 may rotate around backing plate 50 when wheel 10 rotates around torque tube 31. Brake system 40 may be configured such that the compression force exerted on disc stack 42 by actuator 39 causes disc stack 42 to translate toward backing plate 50. For example, the compression force may cause rotor discs 43, 44, 45 to translate over rotor drive key 25 toward backing plate 50 and cause stator discs 47, 48 to translate over spline 49 toward backing plate 50.

Backing plate 50 is configured to resist the translation of disc stack 42 and exert a reaction force on disc stack 42 opposite the compression force exerted by actuator 39, such that disc stack 42 is compressed by actuator 39 between pressure plate 51 and backing plate 50. When torque tube 31 supports backing plate 50, backing plate 50 further exerts a force on torque tube 31 in response to the compression force. In examples, actuator 39 is configured to exert the compression force on disc stack 42 toward backing plate 50 and substantially parallel to axis A.

Thus, brake system 40 may be utilized to reduce and/or eliminate the rotation of wheel 10 using a compression force by actuator 39 exerted on disc stack 42. Backing plate 50 may be configured to react against the compression force, causing a compression of disc stack 42. Torque tube 31 may be configured to support backing plate 50, such that torque tube 31 experiences a force (e.g., substantially parallel to axis A) when actuator 39 exerts the compression force on disc stack 42.

Wheel 10 may be used with any variety of private, commercial, or military aircraft or other type of vehicle. Wheel 10 may be mounted to a vehicle via, for example, axial assembly 28. Axial assembly 28 may be mounted on a strut of a landing gear (not shown) or other suitable component of a vehicle to connect wheel 10 to the vehicle. Wheel 10 may rotate around axis A and axial assembly 28 to impart motion to the vehicle. Wheel 10 is shown and described to provide context to the brake system described herein, however the brake system described herein may be used with any suitable wheel assembly in other examples.

Figure 3:
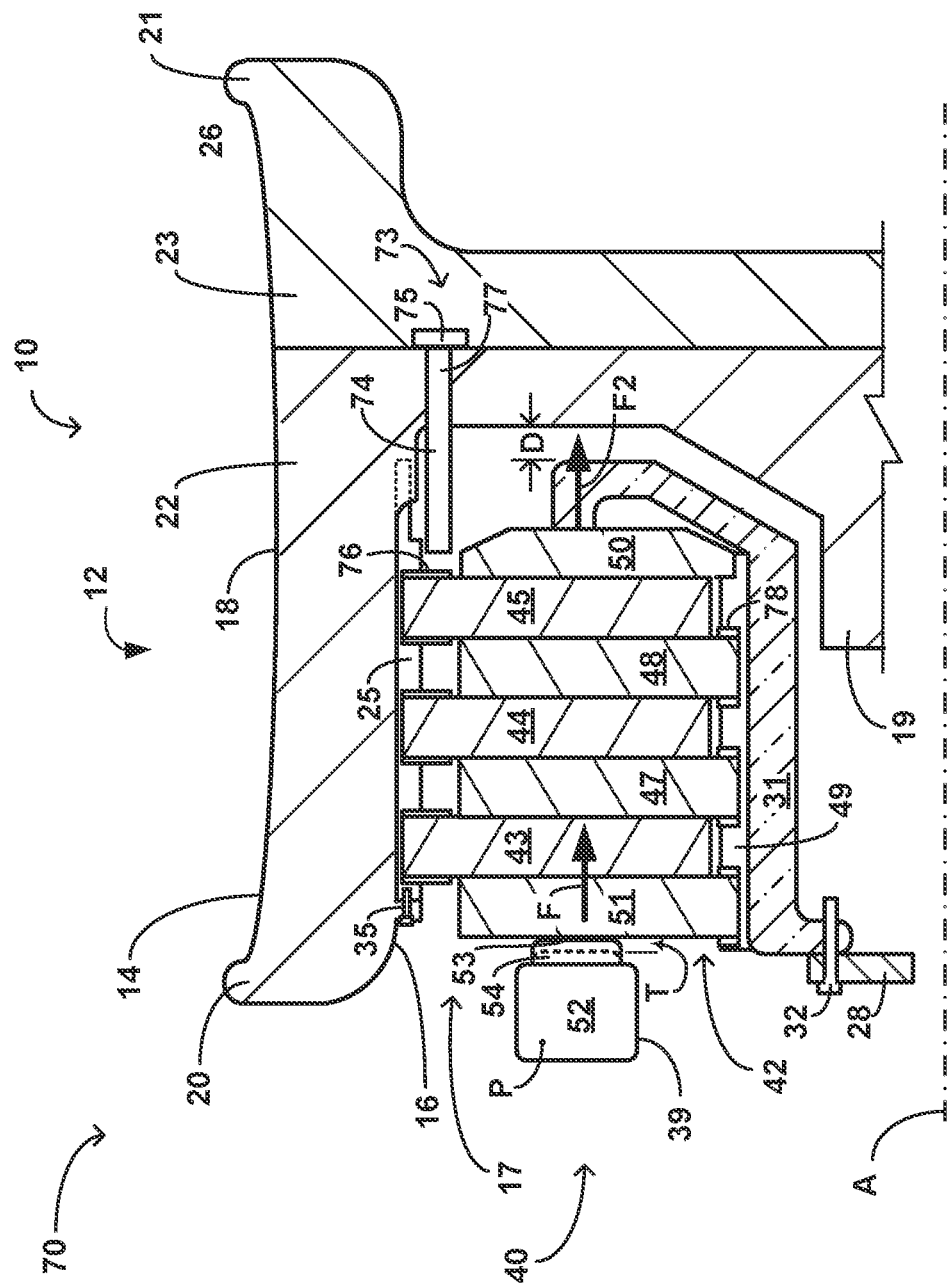
FIG. 3 is a plan view with selected cross-sections illustrating an example assembly including a mechanical stop.

FIG. 3 illustrates an example assembly 70 including an example portion of wheel 10 and an example portion of brake system 40 within wheel well 17 defined by wheel 10. FIG. 3 depicts a cross-section of wheel 10 and selected portions of brake system 40, with the cross-section taken parallel to axial direction A in FIG. 1. As shown in FIG. 3, in examples, rotor drive key 25 is supported by wheel 10 via one or more fasteners 35 (e.g., bolts) attaching rotor drive key 25 to wheel 10, and a torque tube 31 is engaged with a portion of an axial assembly 28 by, e.g., bolt 32.

Wheel 10 and rotor discs 43, 44, 45 are configured to rotate around torque tube 31 and axis A. Stator discs 47, 48, actuator 39, spline 49, and axial assembly 28 are configured to remain substantially rotationally stationary with respect to torque tube 31. When torque tube 31 is engaged with axial assembly 28 and disc stack 42 is in an uncompressed condition (e.g., actuator 39 is not compressing disc stack 42 in a direction towards backing plate 50), torque tube 31 is configured to maintain a displacement D between torque tube 31 and wheel 10. The displacement D may serve to prevent contact between the rotationally stationary torque tube 31 and the rotating wheel 10 when wheel 10 rotates around axis A. As described above, such contact may cause premature maintenance or replacement of wheel 10 and/or brake system 40.

Actuator 39 is configured to compress disc stack 42 to cause a reduction in the rotational speed of wheel 10, and/or substantially prevent a rotational movement of wheel 10 (e.g., when wheel 10 is in a parked condition). Actuator 39 may be configured to exert a compression force on disc stack 42, causing engagement of the friction surfaces on rotor discs 43, 44, 45 and stator discs 47, 48. Actuator 39 may be configured to exert the compression force to cause engagement of a friction surface of a rotor disc and/or stator disc with a friction surface of pressure plate 51 or a friction surface of backing plate 50. In examples, actuator 39 is configured to exert a compression force (e.g., the force F) substantially parallel to axis A on disc stack 42. In examples, actuator 39 includes a body 52 ("actuator body 52") and a piston 54. Actuator 39 may be configured to cause piston 54 to translate relative to actuator body 52 to exert the compression force on disc stack 42. In examples, actuator 39 is configured to cause a piston face 53 to exert the compression force on disc stack 42 (e.g., via pressure plate 51). Some portion of actuator 39 (e.g., actuator body 52) is configured to remain substantially stationary with respect to a portion of torque tube 31 and/or axial assembly 28 when actuator 39 exerts the compression force. In some examples, torque tube 31 and/or axial assembly 28 are configured to limit movement of actuator body 52 when actuator 39 exerts the compression force on disc stack 42. In examples, actuator 39 is mechanically connected to torque tube 31 and/or axial assembly 28.

For example, FIG. 3 illustrates actuator 39 with piston 54 in a first position and in a second position relative to actuator body 52. FIG. 3 illustrates the first position of piston 54 in dashed line, and the second position of piston 54 in solid line. Actuator 39 may be configured to translate piston 54 from the first position to the second position to cause piston face 53 to exert the compression force on disc stack 42. The first position and the second position may be displaced from each other by an amount of piston travel T. That is, actuator 39 may be configured to define a first displacement between piston face 53 and a point P on actuator body 39 in the first position, and define a second displacement between piston face 53 and the point P in the second position, wherein the first displacement and the second displacement define the piston travel T. Actuator 39 may be configured to cause piston 54 to translate over the piston travel T to exert the compression force on disc stack 42.

Disc stack 42 is configured to cause a reduction in the rotational speed of wheel 10 and/or substantially prevent rotational movement of wheel 10 (e.g., in a parked condition) when actuator 39 compresses disc stack 42. A compression force exerted by actuator 39 causes friction surfaces on the rotating rotor discs 43, 44, 45 to engage friction surfaces on the relatively stationary stator discs 47, 48. Engagement with stator discs 47, 48 and/or friction surfaces of pressure plate 51 and/or backing plate 50 causes rotor discs 43, 44, 45 to exert a torque on wheel 10 (e.g., via rotor drive key 25), reducing the speed of wheel 10. When wheel 10 is substantially stationary with respect to torque tube 31 (e.g., when the vehicle is in a parked condition) and actuator 39 is compressing disc stack 42, rotor discs 43, 44, 45 may resist rotational motion of wheel 10.

Figure 4:
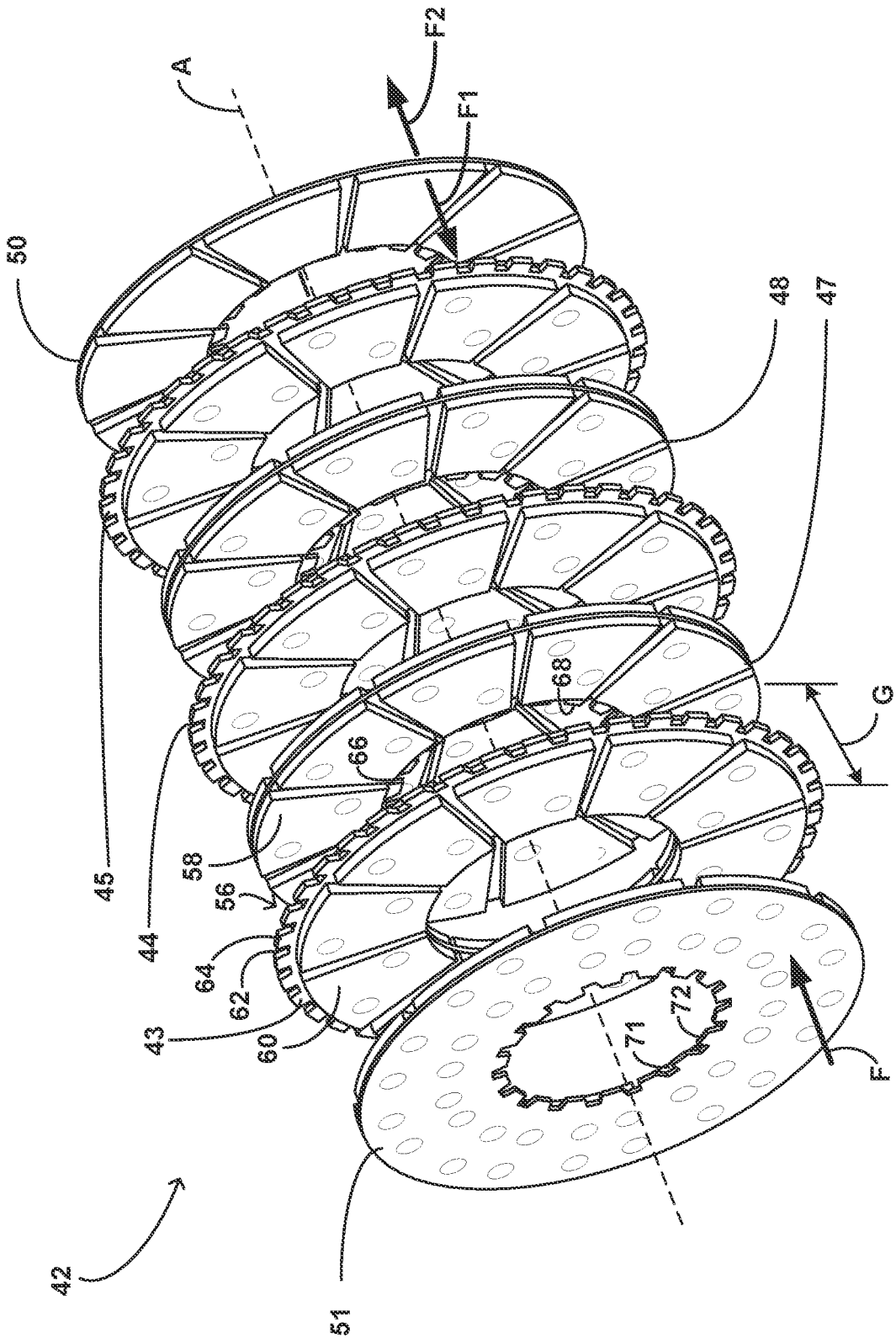
FIG. 4 is an example perspective view of a disc stack.

FIG. 4 illustrates a perspective view of an example disc stack 42 illustrating stator discs 47, 48 interleaved with rotor discs 43, 44, 45. Disc stack 42 may be positioned between pressure plate 51 and backing plate 50. Axis A is included for reference to FIGS. 1-3. Disc stack 42 is illustrated in an uncompressed condition with opposing friction surfaces of adjacent stator and rotor discs disengaged. For example, as illustrated at FIG. 4, an air gap G exists between rotor disc 43 and adjacent stator disc 47 such that friction surface 56 of rotor disc 43 and friction surface 58 of stator disc 47 are substantially disengaged (e.g., not in contact with each other). The air gap G may have any suitable value (e.g., may be larger or smaller than illustrated, relative to disc stack 42). Each of stator discs 47, 48 and rotor discs 43, 44, 45 may have a first friction surface (e.g., friction surface 56 of rotor disc 43) and a second friction surface (e.g., friction surface 60 of rotor disc 43) on an opposite side of the respective disc from the first friction surface. In some examples, each of stator discs 47, 48 and rotor discs 43, 44, 45 may be substantially annular shaped discs, but may have other shapes in other examples.

Rotor discs 44, 45, 46 are configured to rotate substantially synchronously with wheel 10 (FIGS. 1-3). In some examples, each of rotor discs 43, 44, 45 include a plurality of drive slots configured to engage a rotor drive key of wheel 10 to cause the rotation. For example, rotor disc 43 includes drive slot 62 on an outer perimeter 64 of rotor disc 43. Drive slot 62 is configured to engage a rotor drive key (e.g., rotor drive key 25 (FIGS. 1-3) to cause rotor disc 43 to rotate substantially synchronously with wheel 10. Stator discs 47, 48 are configured to substantially remain rotationally stationary with respect to torque tube 31 (FIGS. 2-3) as rotor discs 43, 44, 45 rotate.

Each of stator discs 47, 48 may include a plurality of spline slots configured to engage a spline of torque tube 31 to substantially maintain stator discs 47, 48 rotationally stationary relative to rotor discs 43, 44, 45. That is, stator discs 47, 48 are configured to not rotate when rotor discs 43, 44, 45 rotate. For example, stator disc 47 includes spline slot 66 on an inner perimeter 68 of stator disc 47. Spline slot 66 is configured to engage a spline (e.g., spline 49 (FIGS. 2 and 3) to cause stator disc 47 to substantially remain rotationally stationary with respect to torque tube 31. In similar manner, pressure plate 51 and/or backing plate 50 may include a plurality of spline slots (e.g., spline slot 71 on inner perimeter 72 of pressure plate 51) configured to cause pressure plate 51 and/or backing plate 50 to substantially remain rotationally stationary with respect to torque tube 31. When actuator 39 (FIGS. 2 and 3) exerts the compression force F (e.g., on pressure plate 51), disc stack 42 is compressed between pressure plate 51 and backing plate 50, eliminating the gap G and causing the friction surfaces (e.g., friction surface 56 and friction surface 58) to engage.

Backing plate 50 is configured to exert a reaction force F1 on disc stack 42 in response to the compression force F against backing plate 50. In some examples, backing plate 50 is configured to engage a portion of torque tube 31, such that torque tube 31 substantially limits movement of backing plate 50 in a direction away from pressure plate 51 in a direction parallel to axis A. In some examples, backing plate 50 is configured to exert a force F2 (FIGS. 3 and 4) on torque tube 31 in response to the compression force F. Thus, torque tube 31 (FIGS. 2 and 3) may be configured such that when actuator 39 exerts the compression force F on disc stack 42, torque tube 31 experiences a force F2 based on the compression force F. In examples, the compression force F and the force F2 are substantially parallel to axis A.

Disc stack 42 may include components additional to those depicted in FIGS. 2-4 and/or described above. For example, disc stack 42 can include one or more rotor drive inserts configured to insert at least partially within a drive slot of a rotor disc. For example, disc stack 42 may include rotor drive insert 76 (FIG. 3) configured to insert at least partially within drive slot 62 (FIG. 4) of rotor disc 43. As another example, disc stack 42 may include one or more spline inserts configured to insert at least partially within a spline slot of a stator disc. For example, disc stack 42 may include spline insert 78 (FIG. 3) configured to insert at least partially within spline slot 66 (FIG. 4) of stator disc 47. As used herein, disc stack 42 may include one or more rotor discs such as rotor disc 43, 44, 45, one or more stator discs such as stator disc 47, 48, and other components configured to rotate and/or translate as a substantially rigid body with at least one of the rotor discs (e.g., rotor discs 43, 44, 45) and/or the stator discs (e.g., stator discs 47, 48).

In examples, torque tube 31 (FIG. 3) may comprise a material having a ductility that results in a linear deformation of torque tube 31 under some conditions (e.g., under a high heat load following an emergency stop of a vehicle using brake system 40). For example, when actuator 39 exerts the compression force F causing the force F2 on torque tube 31, the ductility of the material may result in the force F2 causing the linear deformation. The linear deformation of torque tube 31 may be substantially parallel to axis A. In some examples, the linear deformation may cause torque tube 31 to extend towards wheel 10, reducing the displacement D (FIG. 3) between torque tube 31 and wheel 10. The linear deformation of torque tube 31 may increase a displacement between actuator body 39 (e.g., point P) and disc stack 42, increasing the piston travel T required by actuator 39 in order to assure that the compression force F is maintained. Assembly 70 is configured to limit the piston travel T which may be required by actuator 39 by limiting a maximum distance between actuator housing 52 (e.g., point P) and disc stack 42 under certain operating conditions, such as a Rejected Take-Off (RTO) stop. Hence, assembly 70 may act to reduce the reserve capacity requirements of actuator 39 which might be otherwise required when brake system 40 operates under certain conditions.

The reduction in the displacement D between torque tube 31 and wheel 10 may be more pronounced toward the end of the operating life for a given disc stack 42. For example, as rotor discs 43, 44, 45 and stator discs 47, 48 wear and the individual disc thickness are reduced (e.g., thickness substantially parallel to axis A), the linear deformation of torque tube 31 may cause a greater reduction of the displacement D. For example, at the end of life, the greater reduction in the displacement D may occur as a result of higher temperatures caused by a reduction in heat sink material as disc stack 42 and/or other components of brake assembly 40 wear over life. Ensuring that at least some portion of the displacement D remains between torque tube 31 and wheel 10 may limit the dependence of the displacement D on the thickness of disc stack 42, allowing for less frequent replacement of disc stack 42. In addition, as the displacement D reduces, the available travel of piston 54 may become a factor as the individual disc thicknesses are reduced. By ensuring that some portion of the displacement D is maintained over the life of brake system 40, the necessary translation of piston 54 in a direction parallel to axis A to cause sufficient compressing of disc stack 42 in end-of-life scenarios may be reduced, allowing for a measure of space saving within assembly 70.

As shown in FIG. 3, assembly 70 includes a mechanical stop 74 configured to limit a translation of disc stack 42 when actuator 39 exerts the compression force F on disc stack 42 under certain operation conditions. In examples, mechanical stop 74 is configured to limit a translation of disc stack 42 in a direction substantially parallel to axis A. For example, mechanical stop 74 may be configured to limit the translation of disc stack 42 when torque tube 31 linearly deforms in a manner that leads to a reduction in the displacement D (e.g., when actuator 39 causes the linear deformation of torque tube 31). Mechanical stop 74 may be configured to limit the translation of disc stack 42 when torque tube 31 linearly deforms over a displacement less than the displacement D. In some examples, mechanical stop 74 is configured to exert a reaction force on disc stack 42 when mechanical stop 74 encounters disc stack 42. For example, mechanical stop 74 may be configured such that, when torque tube 31 linearly deforms under the influence of force F2, mechanical stop 74 encounters and exerts a reaction force on disc stack 42 to reduce the force F2 experienced by torque tube 31. The reduction of the force F2 on torque tube 31 may substantially cease the linear deformation and resulting extension of torque tube 31 toward wheel 10, preserving at least some portion of the displacement D between torque tube 31 and wheel 10, and limiting the linear translation of disc stack 42 when actuator 39 exerts the compression force F.

Figure 5:
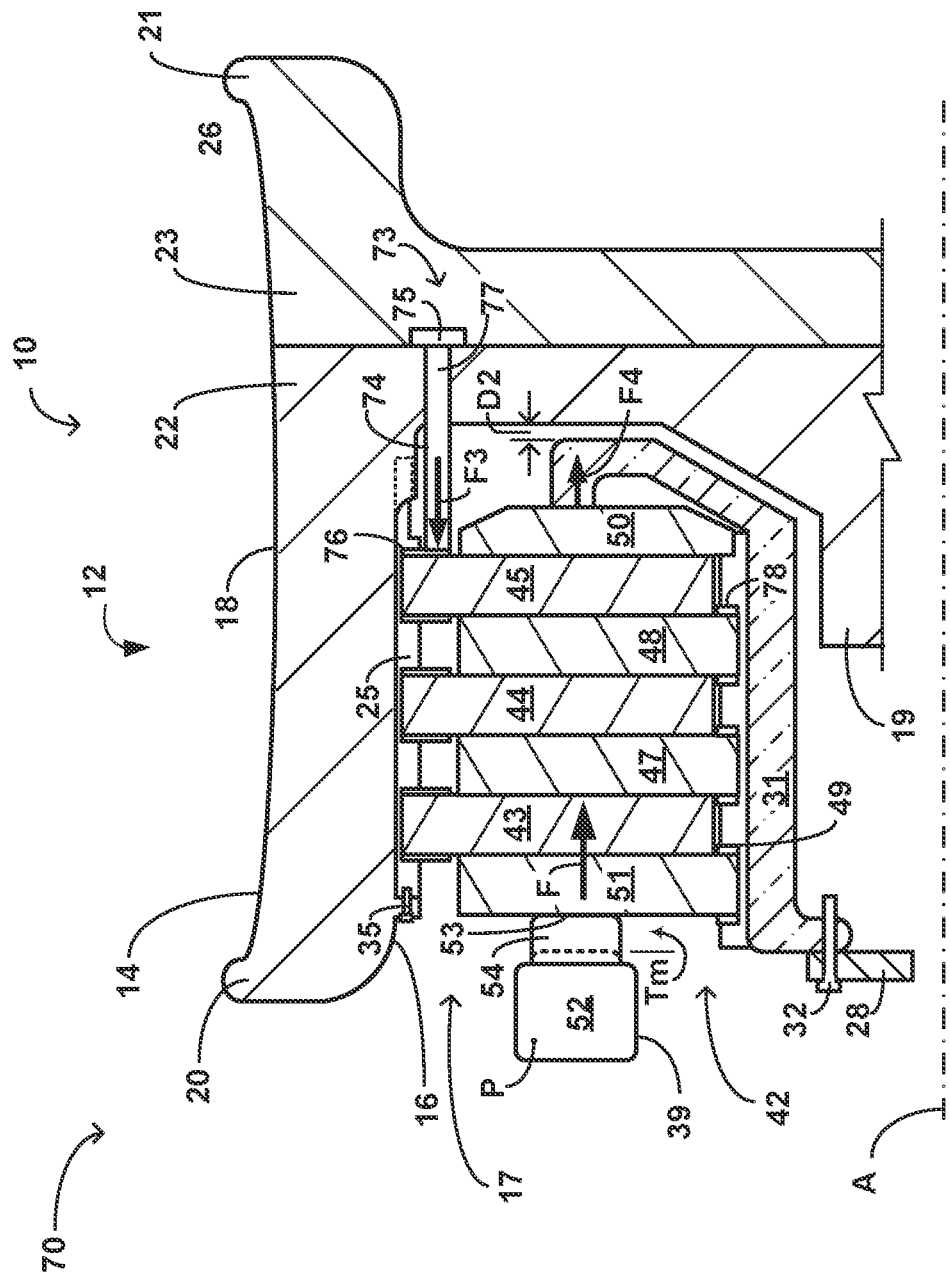
FIG. 5 is a plan view with selected cross-sections illustrating the example assembly of FIG. 3.

For example, FIG. 5 illustrates assembly 70 with mechanical stop 74 encountering disc stack 42. Actuator 39 has translated piston 54 from a first position (indicated in dashed line) to a second position (indicated in solid line) to cause piston face 53 to encounter disc stack 42 (e.g., pressure plate 51) to exert the compression force F on disc stack 42. Actuator 39 has caused piston 54 to translate over the piston travel Tm to exert the compression force F. The compression force F causes a linear translation of disc stack 42 toward backing plate 50.

Mechanical stop 74 may be configured to encounter one or more rotor discs (e.g., rotor discs 43, 44, 45) and/or one or more stator discs (e.g., stator discs 47, 48) when the compression force F causes torque tube 31 to linearly deform under certain conditions. With mechanical stop 74 encountering disc stack 42 (e.g., drive insert 76 and/or rotor disc 45), mechanical stop 74 exerts a reaction force F3 opposing compression force F. The exertion of the reaction force F3 reduces and/or substantially eliminates the necessary reaction force imparted by backing plate 50, reducing and/or substantially eliminating the force F4 on torque tube 31. Reducing and/or substantially eliminating the force F4 on torque tube 31 may reduce and/or substantially eliminate further linear deformation of torque tube 31. Reducing and/or substantially eliminating the further linear deformation of torque tube 31 limits further linear translation of disc stack 42 in a direction away from actuator body 52 (e.g., point P), limiting the amount of piston travel Tm required to maintain a sufficient compression force F. Hence, with mechanical stop 74 having encountered disc stack 42, brake system 40 limits a maximum distance between actuator housing 52 (e.g., point P) and disc stack 42 under certain operating conditions. This may reduce the reserve capacity requirements of actuator 39 which might be otherwise required in the absence of mechanical stop 74.

In examples, mechanical stop 74 is configured to reduce and/or substantially eliminate the force F4 on torque tube 31 (e.g., by exerting the reaction force F3) when actuator 39 causes torque tube 31 to experience a threshold linear deformation. Mechanical stop 74 may be configured to encounter disc stack 42 to exert the reaction force F3 when torque tube 31 experiences a linear deformation sufficient to reduce the displacement D (FIG. 3) to the displacement D2 (FIG. 5). Mechanical stop 74 may be configured to at least partially unload torque tube 31 (e.g., by exerting the reaction force F3) to substantially cease the linear deformation, in order to limit the maximum distance between actuator housing 52 (e.g., point P) and disc stack 42. In examples, assembly 70 is configured such that actuator 39 compresses disc stack 42 at least partially against mechanical stop 74 when mechanical stop 74 encounters disc stack 42. When mechanical stop 74 encounters disc stack 42, assembly 70 may be configured such that actuator 39 compresses disc stack 42 against both backing plate 50 and mechanical stop 74, such that mechanical stop 74 substantially acts to reduce the amount of compression force F transmitted to torque tube 31.

Mechanical stop 74 may be configured to possess a greater axial stiffness than torque tube 31 in a direction substantially parallel to the direction of the compression force F. For example, mechanical stop 74 may comprises a material and/or have a geometry causing the axial stiffness of mechanical stop 74 to exceed that of torque tube 31. The greater axial stiffness may act to ensure mechanical stop 74 sufficiently unloads torque tube 31 without allowing additional linear deformation of mechanical stop 74 and/or torque tube 31.

Mechanical stop 74 may be configured to encounter any portion of disc stack 42. In some examples, mechanical stop 74 is configured to encounter a drive insert (e.g., drive insert 76) of disc stack 42 when actuator 39 compresses disc stack 42. As another example, mechanical stop may be configured to encounter a spline insert (e.g., spline insert 78) of disc stack 42 when actuator 39 compresses disc stack 42. In other examples, mechanical stop 74 is configured to encounter a disc in disc stack 42 having a greater displacement from actuator 39 than another disc in disc stack 42, in order that compression force F causes a greater number of friction surfaces within disc stack 42 to engage (e.g., to substantially preserve braking power).

Mechanical stop 74 may be configured such that, when mechanical stop 74 encounters disc stack 42, a plurality of rotors discs and/or stator discs is compressed between actuator 39 and mechanical stop 74. In examples, mechanical stop 74 is configured to encounter a rotor disc (e.g., rotor disc 45) of disc stack 42 adjacent to or nearest backing plate 50. For example, mechanical stop 74 may be configured to encounter rotor disc 45 when torque tube 31 experiences the threshold linear deformation, such that compression of disc stack 42 against mechanical stop 74 continues to cause engagement of friction surfaces between rotor disc 43 and stator disc 47, between stator disc 47 and rotor disc 44, between rotor disc 44 and stator disc 48, and between stator disc 48 and rotor disc 45.

Figure 6:
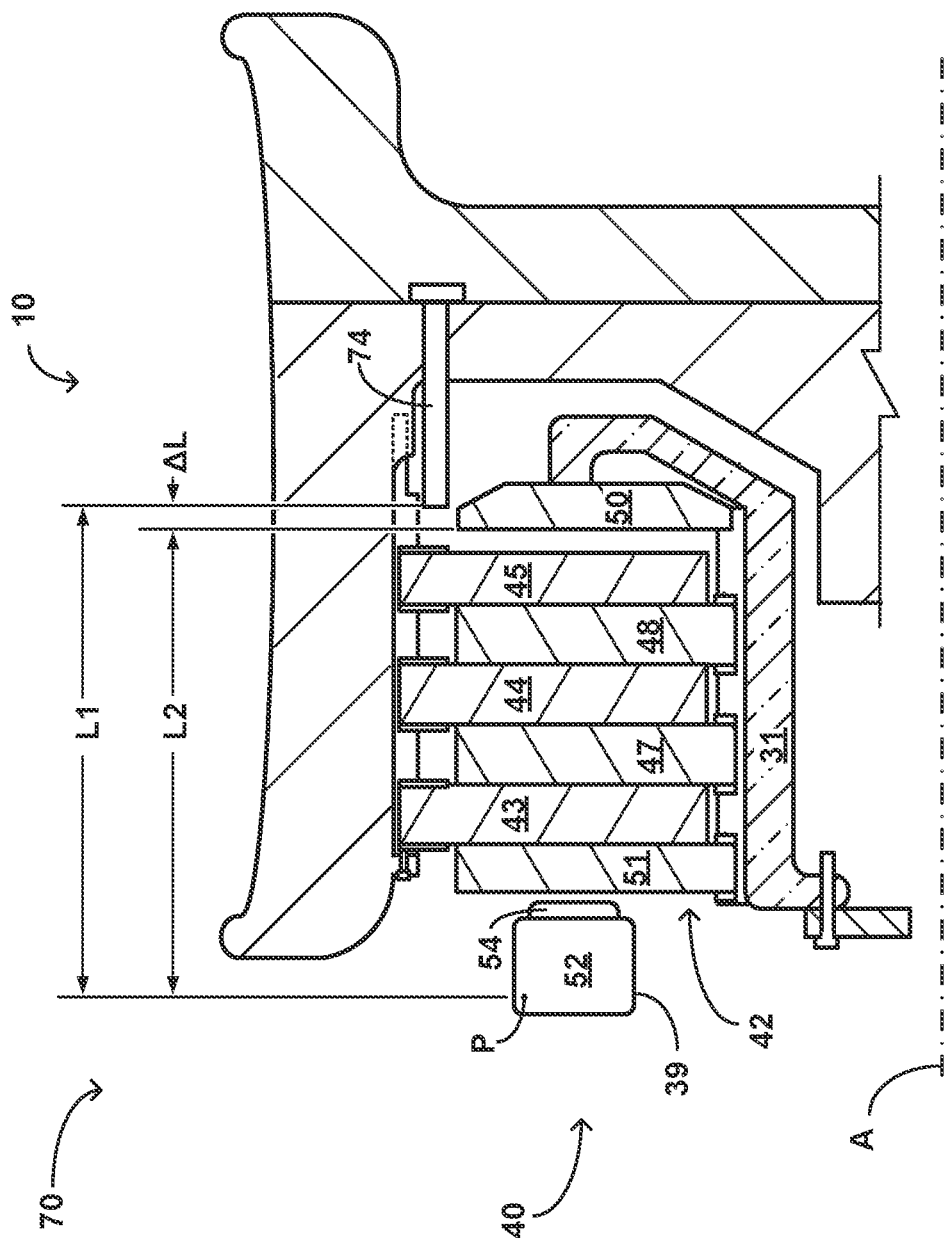
FIG. 6 is a plan view with selected cross-sections illustrating displacements defined by an actuator.

FIG. 6 illustrates assembly 70 with disc stack 42 in an uncompressed condition (e.g., without a compression force exerted by actuator 39). Assembly 70 is configured such that, absent a compression force from actuator 39, assembly 70 substantially maintains a clearance (measured in a direction parallel to axis A) between disc stack 42 and mechanical stop 74. Assembly 70 may be configured such that, when actuator 39 compresses disc stack 42, disc stack 42 encounters backing plate 50 prior to mechanical stop 74. In examples, in the absence of a compression force from actuator 39, actuator 39 defines a first length L1 between actuator 39 and mechanical stop 74 and a second length L2 between actuator 39 and backing plate 50, with the first length L1 greater than the second length L2. The first length L1 and the second length L2 may be defined by a specific point on actuator 39, such as point P on actuator body 52. The first length L1 and the second length L2 may be substantially parallel. In examples, the first length L1 and the second length L2 may be substantially parallel to axis A.

Disc stack 42 is configured to translate substantially parallel to axis A when compressed by actuator 39. Assembly 70 may be configured such that the first length L1 and the second length L2 are substantially parallel to the direction of translation of disc stack 42. Hence, assembly 70 may be configured such that compression of disc stack 42 causes disc stack 42 (e.g., rotor disc 45) to encounter backing plate 50 prior to encountering mechanical stop 74. Further, assembly 70 may be configured such that a threshold linear deformation of torque tube 31 substantially causes disc stack 42 to encounter mechanical stop 74 (e.g., a linear deformation over a distance ΔL between the first distance L1 and the second distance L2). Thus, assembly 70 may be configured such that, when actuator 39 causes torque tube 31 to experience a linear deformation below the threshold linear deformation (or substantially no linear deformation), actuator 39 causes compression of disc stack 42 against backing plate 50 while maintaining a displacement between disc stack 42 and mechanical stop 74. When actuator 39 causes torque tube 31 to experience a linear deformation substantially equal to or above the threshold linear deformation, actuator 39 causes compression of disc stack 42 against backing plate 50 and mechanical stop 74.

Although FIGS. 3, 5 and 6 discuss a linear deformation of torque tube 31 in a direction substantially parallel to axis A reducing a displacement D (FIG. 3) substantially parallel to the axis A, the disclosure herein is not so limited. Mechanical stop 74 may be configured to reduce and/or elimination a linear deformation of torque tube 31 occurring in any direction, and the displacement D may be a displacement in any direction and between any portions of assembly 70. In examples, the displacement D is a displacement between a first portion (e.g., a first component) of assembly 70 and a second portion (e.g., a second component) of assembly 70, wherein the first portion is configured to rotate when wheel 10 rotates and the second portion is configured to remain substantially stationary relative to the rotation of the first portion.

Mechanical stop 74 may be supported in any manner sufficient to allow mechanical 74 to encounter disc stack 42 and exert reaction force F3 on disc stack 42. Mechanical stop 74 may be configured such that a movement of mechanical stop 74 is substantially limited in response to the exertion of reaction force F3. The movement of mechanical stop 74 may be substantially limited by any portion of wheel 10, brake system 40, axial assembly 28 (FIG. 1), or some other component or system sufficient to limit the movement of mechanical stop 74 when mechanical stop 74 exerts the reaction force F3. Mechanical stop 74 may be configured such that, when mechanical stop 74 exerts the reaction force F3 on disc stack 42, some portion of wheel 10, brake system 40, axial assembly 28 (FIG. 1), or another component or system exerts a substantially equal and opposite force on mechanical stop 74 to limit the movement of mechanical stop 74. The portion of wheel 10, brake system 40, axial assembly 28 (FIG. 1), or other component or system supporting mechanical stop 74 may be configured to possess a greater axial stiffness than torque tube 31 in a direction substantially parallel to the direction of the compression force F, in order to allow mechanical stop 74 to transfer load from torque tube 31 in a manner limiting any additional linear deformation of torque tube 31.

In some examples, some portion of wheel 10 is configured to substantially limit movement of mechanical stop 74 when mechanical stop 74 encounters disc stack 42. For example, wheel 10 may support mechanical stop 74 such that, when actuator 39 compresses disc stack 42 against mechanical stop 74, mechanical stop 74 transmits at least a portion of compression force F to wheel 10. In examples, mechanical stop 74 is configured to transmit some portion or substantially all of reaction force F3 to wheel 10. Wheel 10 may be configured to exert a substantially equal and opposite force on mechanical stop 74 to limit the movement of mechanical stop 74. Hence, mechanical stop 74 may be configured to at least partially unload a portion of the compression force F from torque tube 31 by transferring a portion of the compression force F from torque tube 31 to wheel 10 when mechanical stop 74 encounters disc stack 42.

In some examples, mechanical stop 74 is rotationally coupled to wheel 10, such that a rotation of wheel 10 causes a rotation of mechanical stop 74. For example, mechanical stop 74 may be configured to rotate synchronously with wheel 10. In some examples, mechanical stop 74 is rotationally coupled with wheel 10 and configured to encounter a portion of disc stack 42 (e.g., rotor disc 45 and/or drive insert 76) rotationally coupled to wheel 10, in order to substantially avoid contact between mechanical stop 74 and portions of disc stack 42 configured to be rotationally mismatched with mechanical stop 74. This may serve to minimize or even prevent contact between components configured to rotate with wheel 10 (e.g., mechanical stop 74) and components configured to remain substantially stationary relative to torque tube 31. Such contact may result in a need for unscheduled maintenance or early replacement of one or more components of wheel 10 or brake system 40.

Mechanical stop 74 can have any suitable configuration. In some examples, mechanical stop 74 is an elongated member engaged with wheel 10 and defining a shank 77. Shank 77 is configured to encounter disc stack 42 and exert the reaction force F3 on disc stack 42. Mechanical stop 74 may be configured and positioned such that shank 77 extends in a direction from interior surface 16 of wheel 10 toward disc stack 42. Shank 77 may be configured to encounter disc stack 42 when mechanical stop 74 encounters disc stack 42. In some examples, mechanical stop 74 includes a pin 73 defining shank 77 and having a head 75 attached to shank 77. Wheel 10 may be configured to engage some portion of pin 73 to limit movement of at least shank 77 relative to wheel 10. For example, wheel 10 may be configured to substantially trap a portion of mechanical stop 74 (e.g., head 75) between inboard section 22 and outboard section 23 of wheel 10. Wheel 10 may be configured to limit the movement of pin 73 in any suitable manner, including through internal or external threads defined by wheel 10, a fastener and/or locking device configured to engage pin 73 and wheel 10, an interference and/or engineering fit between pin 73 and a recess defined by wheel 10, or a welded, soldered, or other connection between pin 73 and wheel 10.

Figure 7:
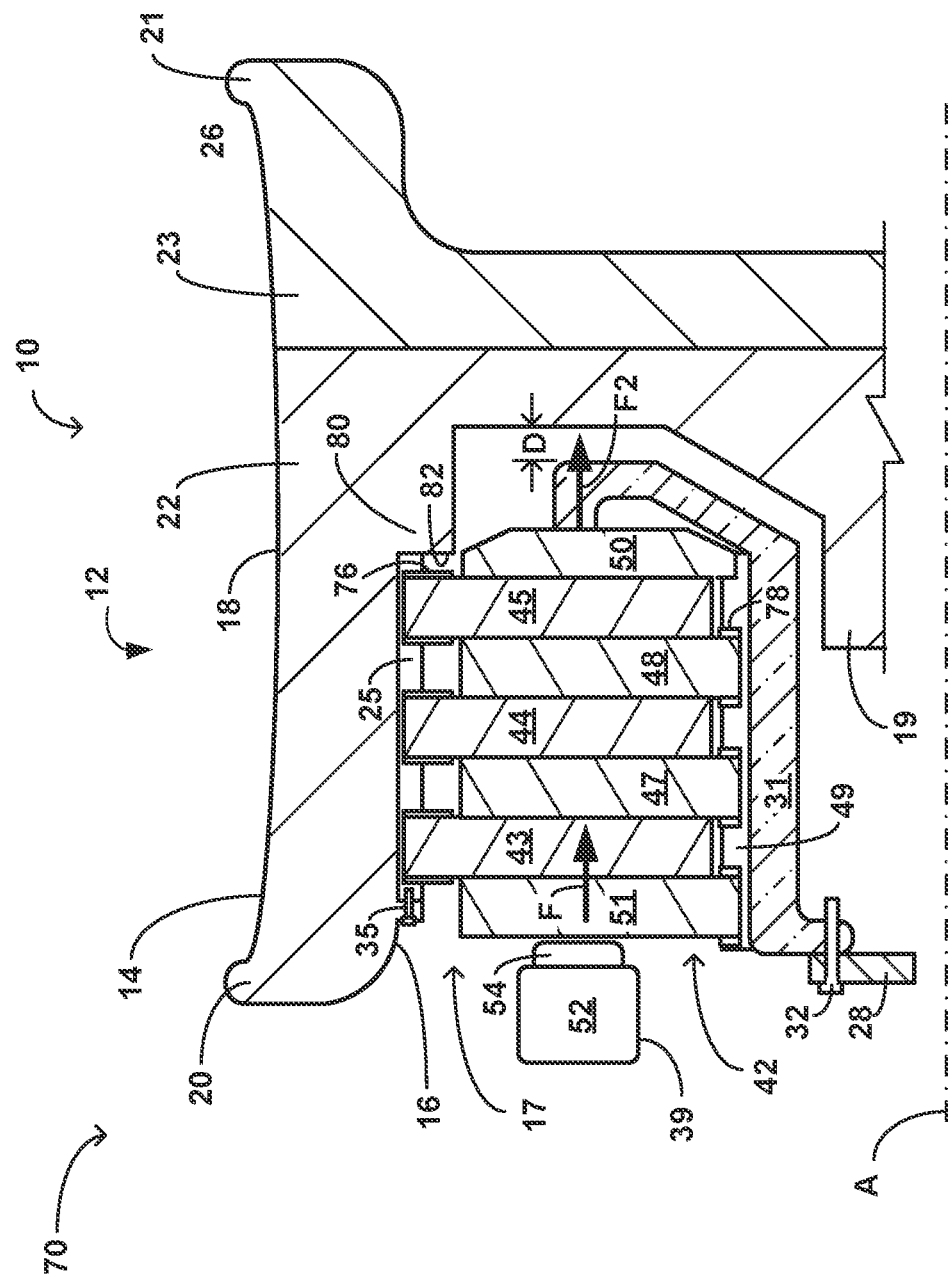
FIG. 7 is a plan view with selected cross-sections illustrating an example assembly including a mechanical stop integral with a wheel.

FIG. 7 illustrates another example mechanical stop 80, which is configured as a step or ledge engaged with wheel 10. Mechanical stop 80 is an example of mechanical stop 74. Mechanical stop 80 extends from the interior surface 16 of wheel 10 (e.g., extends radially inward from interior surface 16). Mechanical stop 80 may be configured to act as a substantially rigid body relative to wheel 10. In some examples, mechanical stop 80 defines a bearing surface 82 configured to encounter disc stack 42 when torque tube 31 experiences a threshold linear deformation (e.g., a linear deformation causing the displacement D2 (FIG. 5)). Bearing surface 82 may be configured to exert the reaction force F3 (FIG. 5) on disc stack 42 when bearing surface 82 encounters disc stack 42. In examples, bearing surface 82 is configured to substantially face some portion of disc stack 42. Bearing surface 82 may be configured to substantially abut some portion of disc stack 42 when mechanical stop 80 encounters disc stack 42.

Bearing surface 82 may be a substantially planar surface in some examples and a curvilinear surface in other examples. In some examples, bearing surface 82 defines a surface complementary to a surface of disc stack 42. For example, bearing surface 82 may be configured to complement a surface of a brake disc (e.g., rotor disc 45) when bearing surface 82 encounters the surface of the brake disc. As an example, in some examples, support bearing surface 82 comprises a first planar surface and the surface of the brake disc defines a second planar surface, where the first and second planar surfaces are substantially parallel (e.g., parallel or nearly parallel to the extent permitted by manufacturing tolerances) when disc stack 42 is positioned within wheel well 17. As another example, one of the first bearing surface or the second bearing surface can be a convex surface, with the other being a concave surface configured to receive and at least partially mate with the convex surface when mechanical stop 80 encounters disc stack 42. As another example, one of the first bearing surface or the second bearing surface can define a protrusion, and the other of the first bearing surface or the second bearing surface can define a recess configured to receive and at least partially mate with the protrusion when mechanical stop 80 encounters disc stack 42.

Bearing surface 82 defines a height measured in a direction perpendicular to axis A, where the height is sufficient to cause bearing surface 82 to encounter disc stack 42 when actuator 39 causes a threshold linear deformation of torque tube 31. Bearing surface 82 may define a width measured in a direction perpendicular to the height and axis A. In some examples, the width of bearing surface 82 defines an arc around axis A. Bearing surface 82 may define a substantially constant height over the width of bearing surface 82. In some examples, bearing surface defines a varying height over the width of bearing surface 82.

Figure 8:
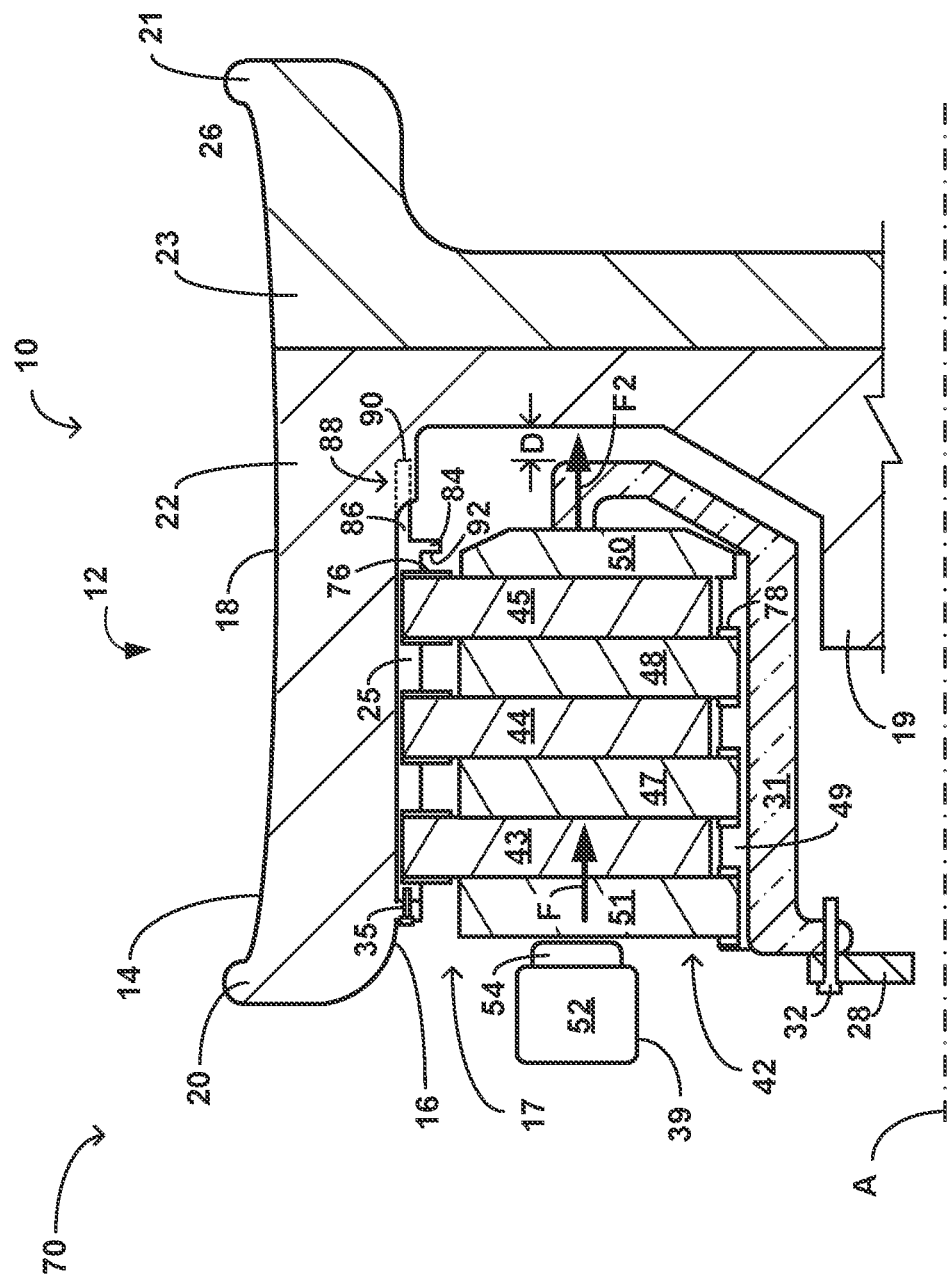
FIG. 8 is a plan view with selected cross-sections illustrating an example assembly including a mechanical stop integral with a rotor drive key.

FIG. 8 illustrates another example mechanical stop 84, which is shown as being engaged with a component 86 of wheel 10 ("wheel component 86"). Mechanical stop 84 is an example of mechanical stop 74 and/or mechanical stop 80. In the example shown in FIG. 8, mechanical stop 84 is engaged with wheel component 86. Wheel component 86 may be a portion of rotor drive key 25. Wheel component 86 may be configured to be substantially stationary with respect to interior surface 16 of wheel 10, such that when wheel 10 (and interior surface 16) rotates around axis A, wheel component 86 rotates around axis A. Thus, rotation wheel of component 86 around axis A causes a rotation of mechanical stop 84 around axis A. Wheel component 86 may be, for example, the portion of rotor drive key 25, or some other component of assembly 70 configured to rotate around axis A when wheel 10 rotates around axis A.

Wheel component 86 is configured to limit movement of mechanical stop 84 when mechanical stop 84 exerts a reaction force (e.g., reaction force F3 (FIG. 5)) on disc stack 42. In some examples, mechanical stop 84 is configured such that, when actuator 39 compresses disc stack 42 against mechanical stop 84, mechanical stop 84 transmits a force to wheel component 86 caused by the compression force of actuator 39 acting on mechanical stop 84. Wheel component 86 may be configured to exert a substantially equal and opposite force on mechanical stop 84 to limit the movement of mechanical stop 84 in a direction parallel to axis A.

Wheel 10 is configured to limit movement of wheel component 86 relative to wheel 10 when wheel component 86 exerts a force on mechanical stop 84 (e.g., when actuator 39 causes mechanical stop 84 to transmit force to wheel component 86). For example, wheel 10 may be configured to limit motion of wheel component 86 in a direction substantially parallel to the direction of a compression force (e.g., compression force F (FIGS. 3, 5) exerted by actuator 39 on disc stack 42. Wheel 10 may be configured to exert a substantially equal and opposite force on wheel component 86 when mechanical stop 84 transmits force to wheel component 86. Hence, mechanical stop 84 may be configured to substantially transfer some portion of the compression force F exerted by actuator 39 from disc stack 42 to wheel 10. Mechanical stop 84 may be configured to reduce and/or substantially eliminate the load on torque tube 31 caused by actuator 39, such that linear deformation of torque tube 31 reduces and/or substantially ceases and a maximum distance between actuator housing 52 (e.g., point P) and disc stack 42 is limited.

In examples, wheel component 86 is attached to or defined by rotor drive key 25. For example, wheel component 86 may be portion of rotor drive key 25, e.g., mechanical stop 84 may be a unitary (e.g., substantially inseparable) portion of rotor drive key 25 or separate from and attached to rotor drive key 25. As discussed above, wheel 10 may be configured to limit movement of rotor drive key 25 relative to wheel 10 using, e.g., one or more fasteners 35 (e.g., bolts) attaching rotor drive key 25 to wheel 10. In examples, instead of or in addition to fasteners 35, wheel 10 may be configured to receive a protrusion 88 of rotor drive key 25 within a recess 90 defined by wheel 10.

Rotor drive key 25 may be configured to exert a force on wheel 10 (e.g., via fasteners 35, protrusion 88, or another attachment mechanism) when mechanical stop 84 transmits a force to rotor drive key 25 (e.g., caused by the compression force of actuator 39 acting on mechanical stop 84). Wheel 10 may be configured to exert a substantially equal and opposite force on rotor drive key 25 when mechanical stop 84 transmits the force to rotor drive key 25. Hence, rotor drive key 25 may be configured to substantially transfer some portion of the compression force F exerted by actuator 39 from disc stack 42 to wheel 10, when mechanical stop 84 encounters disc stack 42.

In some examples, rotor drive key 25 is configured to possess a greater axial stiffness than torque tube 31 in a direction substantially parallel to the direction of the compression force F. For example, rotor drive key 25 may comprise a material and/or have a geometry causing the axial stiffness of rotor drive key 25 to exceed that of torque tube 31. The greater axial stiffness may enable rotor drive key 25 to sufficiently unload torque tube 31 without a linear deformation of rotor drive key 25 and/or an additional linear deformation of torque tube 31.

In the example shown in FIG. 8, mechanical stop 84 defines a bearing surface 92 configured to encounter disc stack 42 when torque tube 31 experiences a threshold linear deformation (e.g., a linear deformation causing the displacement D2 (FIG. 5)). Bearing surface 92 may be an example of bearing surface 82, and may be configured relative to disc stack 42 in the same manner as that discussed for bearing surface 82 and disc stack 42.

Figure 9:
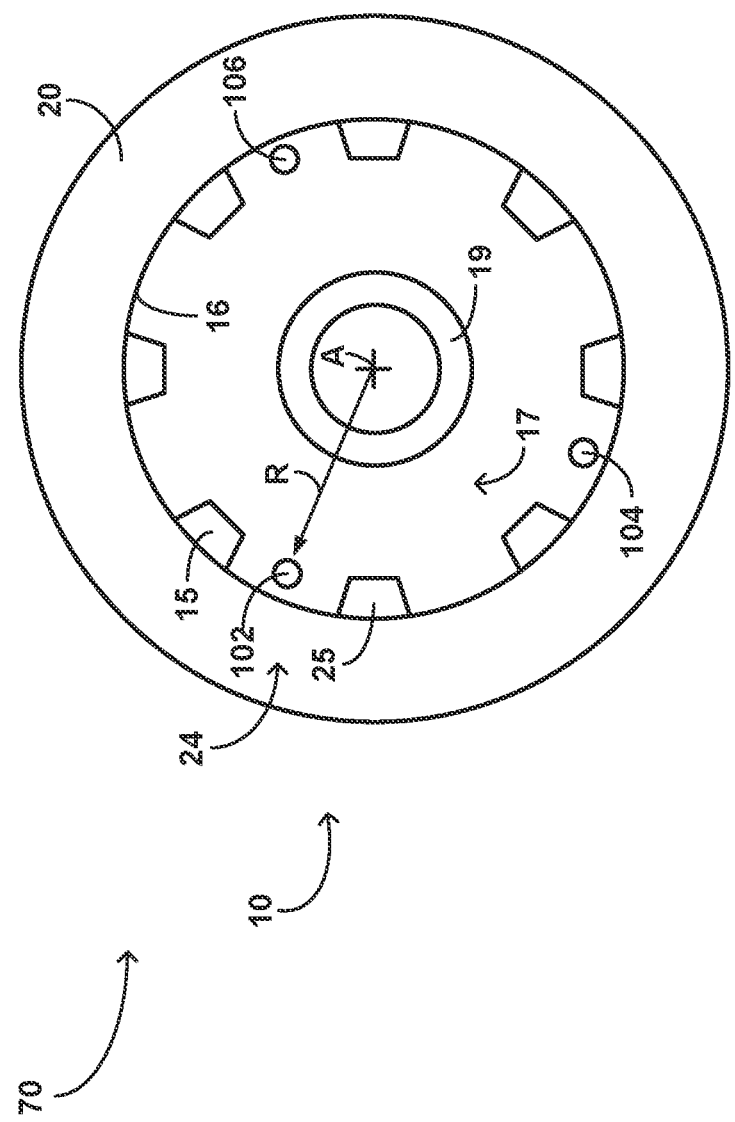
FIG. 9 is a plan view illustrating portions of the assembly relative to a wheel axis.

Example wheel assemblies described herein can include any suitable number of mechanical stops. FIG. 9 schematically illustrates a portion of assembly 70 having a plurality of mechanical stops including mechanical stop 102, mechanical stop 104, and mechanical stop 106. Assembly 70 is shown from a direction looking down axis A. That is, FIG. 9 illustrates wheel 10 with axis A perpendicular to the page. Mechanical stops 102, 104, 106 are each examples of mechanical stop 74, mechanical stop 80, and/or mechanical stop 84. FIG. 9 further illustrates interior surface 16, wheel hub 19, inboard bead seat 20, and plurality of rotor drive keys 24 engaged with interior surface 16. Brake system 40 is omitted from FIG. 9 for clarity. Mechanical stops 102, 104, 106 are positioned around axis A within wheel well 17 of wheel 10.

Each of mechanical stops 102, 104, 106 may be configured to exert a reaction force (e.g., reaction force F3 (FIG. 5)) on disc stack 42 when mechanical stops 102, 104, 106 encounter disc stack 42. Mechanical stops 102, 104, 106 may be configured around axis A to distribute the exertion of the reaction force on disc stack 42 (e.g., to reduce stress and/or eliminate concentrations on portions of disc stack 42). For example, mechanical stops 102, 104, 106 may be configured to exert the reaction force at one or more locations on rotor disc 43, 44, 45 and/or stator disc 47, 48. Mechanical stops 102, 104, 106 may be configured to exert the reaction substantially force around a perimeter of rotor disc 43, 44, 45 and/or stator disc 47, 48. Assembly 70 may include any number of mechanical stops arranged in any manner sufficient to cause one or more of the mechanical stops to encounter disc stack 42 (FIGS. 3, 5, 6) when actuator 39 compresses disc stack 42 (e.g., when actuator 39 causes torque tube 31 to experience the threshold linear deformation).

Each of mechanical stops 102, 104, 106 may be radially displaced from axis A. For example, FIG. 9 illustrates mechanical stop 102 radially displaced from axis A by the radius R. Each of mechanical stops 102, 104, 106 may be radially displaced from axis A by an individual radius from axis A. The individual radii may define a different displacement for each mechanical stop and/or substantially similar displacements for one or more mechanical stops. In examples, mechanical stops 102, 104, 106 are positioned with wheel well 17 to define a substantially circumferential pattern around axis A. Mechanical stops 102, 104, 106 may be evenly or unevenly spaced around axis A. Mechanical stops 102, 104, 106 may be spaced such that a spacing distance (e.g., an arc length) between adjacent mechanical stops is substantially equal around axis A. Mechanical stops 102, 204, 106 may be spaced such that the spacing distance (e.g., the arc length) between adjacent mechanical stops varies around axis A. The spacing distance and/or arc length may be defined in a place substantially perpendicular to axis A.

In examples, each mechanical stop 102, 104, 106 is configured to reside substantially between adjacent rotor drive keys in the plurality of rotor drive keys 24. For example, FIG. 9 illustrates mechanical stop 102 positioned substantially between rotor drive key 25 and the adjacent rotor drive key 15. Mechanical stop 102 may be configured to reside closer to rotor drive key 15 than rotor drive key 25, further away rotor drive key 15 than rotor drive key 25, or substantially equidistant from rotor drive key 25 and rotor drive key 15. In some examples, mechanical stop 102 may extend substantially from rotor drive key 25 to rotor drive key 15, such that mechanical stop 102 is configured to exert the reaction force on disc stack 42 over a larger area (e.g., to reduce stress on disc stack 42).

Assembly 70 may include any suitable number of mechanical stops between adjacent rotor drive keys (e.g., rotor drive key 25 and rotor drive key 15) and the mechanical stops may be arranged in any pattern relative to the adjacent rotor drive keys. For example, a first mechanical stop and a second mechanical stop can be between rotor drive key 25 and rotor drive key 15, with the first mechanical stop closer to rotor drive key 25 than rotor drive key 15 and the second mechanical stop closer to rotor drive key 15 than rotor drive key 25.

Mechanical stops described herein, including mechanical stops 74, 80, 84, 102, 104, 106, as well as wheel 10 and brake system 40, and the components thereof, may be made from any suitable material. For example, the material may be any material of suitable strength for the intended use of mechanical stops 74, 80, 84, 102, 104, 106, wheel 10, brake system 40, and the components thereof. In some examples, the material includes a metal or a metal alloy. For example, the material may include a nickel alloy or steel alloy. As one example, the material may include stainless steel.

Mechanical stops 74, 80, 84, 102, 104, 106, wheel 10, brake system 40, and the components thereof can be formed using any suitable technique. Mechanical stops 74, 80, 84, 102, 104, 106, wheel 10, brake system 40, and the components thereof may be forged, casted, made from bar stock, additive manufactured (e.g., three-dimensionally (3D) printed), extruded, drawn, or be produced using other suitable methods. In some examples, mechanical stops 74, 80, 84, 102, 104, 106, wheel 10, brake system 40, and the components thereof may be machined to define the configurations described herein. In other examples, Mechanical stops 74, 80, 84, 102, 104, 106, wheel 10, brake system 40, and the components thereof may be formed without having to be substantially machined.

In some examples, wheel 10 may be finish machined from a near-net-shaped aluminum forging and contain an axial assembly and/or wheel rim for assembly of brake system 40 and/or mechanical stop 74, 80, 84, 102, 104, 106 onto wheel 10. In other examples, wheel 10 may be manufactured in a different manner. In yet other examples, wheel 10 may be obtained rather than manufactured. Wheel 10 may be made of any suitable material. In some examples, wheel 10 includes a metal or a metal alloy. For example, wheel 10 may include aluminum, a nickel alloy, a steel alloy (e.g., stainless steel), titanium, a carbon-composite material, or magnesium.

Brake discs described herein, including rotor discs 43, 44, 45 and stator discs 47, 48, may be manufactured from any suitable material. In some examples, the brake discs described herein may be manufactured from a metal or a metal alloy, such as a steel alloy. In some examples, the brake discs may be manufactured using a ceramic material, such as a ceramic composite. In some examples, the brake discs may be manufactured from a carbon-carbon composite material. In some examples, the brake discs may be manufactured using a carbon-carbon composite material having a high thermal stability, a high wear resistance, and/or stable friction properties. The brake discs may include a carbon material with a plurality of carbon fibers and densifying material. The carbon fibers may be arranged in a woven or non-woven as either a single layer or multilayer structure.

Figure 10:
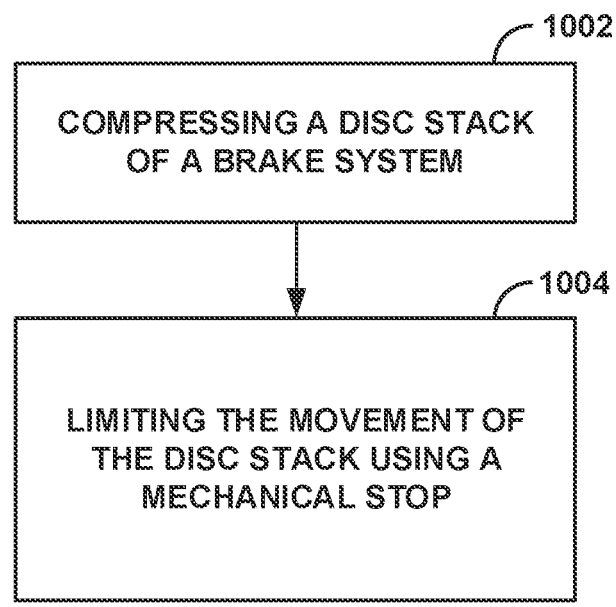
FIG. 10 is a flow diagram illustrating an example method of reducing a reaction force using a mechanical stop.

FIG. 10 is a flow diagram illustrating an example technique for compressing a disc stack using an actuator. While the technique is described with reference to specific example wheel 10, brake system 40, and mechanical stops 74, 80, 84, 102, 104, 106 described herein, the technique may be used with other components in other examples.

The technique includes compressing a disc stack 42 using an actuator 39 (1002). Brake system 40 may be configured such that compression of disc stack 42 by actuator 39 causes engagement of the friction surfaces of rotor discs 43, 44, 45 and stator discs 47, 48, reducing and/or substantially preventing the rotation of wheel 10. Rotor discs 43, 44, 45 and stator discs 47, 48 may be configured to translate in a direction substantially parallel to an axis A of wheel 10 when actuator 39 compresses disc stack 42. Actuator 39 may be configured to exert a compression force F against disc stack 42 to compress disc stack 42. In examples, actuator 39 includes an actuator body 52 and a piston 54 configured to translate relative to actuator body 52 to cause the compression of disc stack 42. Actuator 39 may be configured to cause a translation of piston 54 relative to actuator body 52 using a supply of a pressurized hydraulic fluid, one or more electric motors, or some other appropriate methodology.

Actuator 39 may be configured to compress disc stack 42 against backing plate 50 using the compression force F. Backing plate 50 may be configured to transmit at least some portion of the compression force F to torque tube 31. Torque tube 31 may be configured to exert a reaction force on backing plate 50 in response to the compression force F. Torque tube 31 may be configured such that, under certain conditions (e.g., a high heat load), torque tube 31 linearly deforms as torque tube 31 exerts the reaction force on backing plate 50.

Linear displacement of disc stack 42 is limited using a mechanical stop 74, 80, 84, 102, 104, 106 (1004). For example, disc stack 42 may encounter mechanical stop 74, 80, 84, 102, 104, 106 when actuator 39 compresses disc stack 42, due at least in part to the stretching of torque tube 31 in a direction parallel to axis A. Mechanical stop 74, 80, 84, 102, 104, 106 may be configured to exert a reaction force F3 (FIG. 5) against disc stack 42 when mechanical stop 74, 80, 84, 102, 104, 106 encounters disc stack 42. Mechanical stop 74, 80, 84, 102, 104, 106 may be configured to reduce the reaction force exerted by torque tube 31 on backing plate 50 when mechanical stop 74, 80, 84, 102, 104, 106 exerts the reaction force F3. Thus, mechanical stop 74, 80, 84, 102, 104, 106 is configured to limit the linear displacement of disc stack 42 when mechanical stop 74, 80, 84, 102, 104, 106 encounters disc stack 42. Mechanical stop 74, 80, 84, 102, 104, 106 may be configured to limit and/or substantially cease the linear deformation of torque tube 31 when mechanical stop 74, 80, 84, 102, 104, 106 encounters disc stack 42.

Assembly 70 may be configured such that, when actuator 39 compresses disc stack 42, disc stack 42 encounters backing plate 50 prior to mechanical stop 74, 80, 84, 102, 104, 106. In some examples, assembly 70 defines a first length L1 between actuator 39 and mechanical stop 74 and a second length L2 between actuator 39 and backing plate 50, with the first length L1 greater than the second length L2. In examples, the first length L1 and the second length L2 may be substantially parallel to axis A. Assembly 70 may be configured such that a threshold linear deformation of torque tube 31 caused by the compression F from actuator 39 substantially causes disc stack 42 to encounter mechanical stop 74, 80, 84, 102, 104, 106.

Some portion of the reaction force F3 exerted by mechanical stop 74, 80, 84, 102, 104, 106 is transferred to wheel 10. Wheel 10 may be configured to substantially limit movement of mechanical stop 74, 80, 84, 102, 104, 106 when mechanical stop 74, 80, 84, 102, 104, 106 exerts the reaction force F3. Wheel 10 may be configured to exert a force on mechanical stop 74, 80, 84, 102, 104, 106 in response to the reaction force F3 exerted by mechanical stop 74, 80, 84, 102, 104, 106 on disc stack 42. In some examples, mechanical stop 74, 80, 84, 102, 104, 106 is an elongate pin supported and/or defined by wheel 10. In some examples, mechanical stop 74, 80, 84, 102, 104, 106 is a step or ledge supported and/or defined by wheel 10. In some examples, mechanical stop 74, 80, 84, 102, 104, 106 is supported by a wheel component 86 of wheel 10. Wheel component 86 may be a rotor drive key 25, 15 in a plurality of rotor drive keys 24 coupled to an interior surface 16 of wheel 10.

The present disclosure includes the following examples.

Example 1: An assembly comprising: a wheel configured to rotate around a wheel axis; a brake system comprising: a disc stack comprising a rotor disc and a stator disc, wherein the rotor disc is rotationally coupled to the wheel, and wherein the wheel is configured to rotate relative to the stator disc; and an actuator defining an actuator housing and configured to compress the disc stack, wherein the brake system is configured to compress the disc stack by limiting the linear movement of the disc stack by exerting a reaction force on the disc stack when the actuator compresses the disc stack, and wherein a portion of the brake system is configured to linearly deform when the brake system exerts the reaction force; and a mechanical stop configured to reduce the reaction force exerted by the brake system when the linear deformation of the portion of the brake system causes the mechanical stop to encounter the brake system, such that the mechanical stop limits a linear displacement of the disc stack relative to the actuator housing.

Example 2: The assembly of example 1, wherein the mechanical stop is configured to encounter the disc stack when the mechanical stop encounters the brake system.

Example 3: The assembly of example 1 or 2, wherein the mechanical stop is configured to transmit at least a portion of the reaction force to the wheel.

Example 4: The assembly of any of examples 1-3, wherein the mechanical stop is rotationally coupled to the wheel.

Example 5: The assembly of any of examples 1-4, wherein the mechanical stop is configured to maintain a displacement between the brake system and the wheel.

Example 6: The assembly of example 5, wherein the brake system includes a torque tube, wherein the wheel is configured to rotate relative to the torque tube, and wherein the mechanical stop is configured to maintain the displacement between the torque tube and the wheel.

Example 7: The assembly of any of examples 1-6, further comprising a wheel component attached to the wheel, wherein the wheel component includes the mechanical stop.

Example 8: The assembly of example 7, wherein the wheel component is a rotor drive key.

Example 9: The assembly of any of examples 1-8, wherein the mechanical stop includes a bearing surface defined by an interior surface of the wheel, wherein the bearing surface is configured to encounter the brake disc stack.

Example 10: The assembly of any of examples 1-9, further comprising a backing plate configured to encounter the disc stack when the actuator compresses the disc stack, wherein the wheel is configured to rotate relative to the backing plate, and wherein the backing plate is configured to move in an axial direction of the wheel when the portion of the brake system linearly deforms.

Example 11: The assembly of any of examples 1-10, wherein the brake system includes a torque tube configured to exert a portion of the reaction force, and wherein the mechanical stop is configured to reduce the portion of the reaction force exerted by the torque tube when the mechanical stop encounters the brake system and the actuator compresses the disc stack, such that the mechanical stop reduces the reaction force exerted by the brake system and limits the linear displacement of the disc stack relative to the actuator housing.

Example 12: The assembly of any of examples 1-11, wherein: the actuator is configured to compress the disc stack using a compression force, the actuator defines a first length between the actuator and the mechanical stop in the absence of the compression force, the actuator defines a second length between the actuator and the backing plate in the absence of the compression force, the first and second lengths being measured in a parallel direction, and the first length is greater than the second length.

Example 13: The assembly of any of examples 1-12, wherein the mechanical stop is configured to encounter a portion of the disc stack rotationally coupled to the wheel.

Example 14: The assembly of any of examples 1-13, wherein the mechanical stop is configured to encounter a portion of the disc stack, and wherein the wheel is configured to rotate relative to the portion of the disc stack.

Example 15: The assembly of any of examples 1-14, wherein the mechanical stop is configured to encounter a drive insert within a drive slot of the rotor disc.

Example 16: An assembly comprising: a wheel configured to rotate around a wheel axis; a brake system comprising: a disc stack; a torque tube configured to engage the disc stack; a backing plate attached to the torque tube, wherein the backing plate is configured to limit movement of the disc stack in a direction parallel to the wheel axis; and an actuator configured to compress the disc stack against the backing plate using a compression force, wherein the backing plate is configured to exert a reaction force on the disc stack when the actuator compresses the disc stack; and a mechanical stop configured to encounter the disc stack, wherein: the mechanical stop is configured to reduce the reaction force when the mechanical stop encounters the disc stack, the mechanical stop is configured to limit movement of the disc stack in the direction parallel to the wheel axis when the mechanical stop encounters the disc stack, such that the mechanical stop limits a linear displacement of the disc stack relative to the actuator; the actuator defines a first length between the actuator and the mechanical stop in the absence of the compression force, the actuator defines a second length between the actuator and the backing plate in the absence of the compression force, the first and second lengths being measured in a direction parallel to the wheel axis, and the first length is greater than the second length.

Example 17: The assembly of example 16, wherein the mechanical stop is rotationally coupled to the wheel, and wherein the mechanical stop is configured to encounter a portion of the disc stack rotationally coupled to the wheel.

Example 18: The assembly of example 16 or 17, wherein the mechanical stop is configured to transmit at least a portion of the reaction force to the wheel when the mechanical stop encounters the disc stack.

Example 19: A method comprising: compressing a disc stack of a brake system using an actuator of the brake system, wherein the disc stack includes a rotor disc rotationally coupled to a wheel and a stator disc, wherein the wheel is configured to rotate around the stator disc, wherein the brake system exerts a reaction force on the disc stack when the actuator compresses the disc stack; and limiting the movement of the disc stack by reducing the reaction force exerted by the brake system by causing the brake system to encounter a mechanical stop using the compression of the disc stack by the actuator.

Example 20: The method of example 19, wherein the mechanical stop rotates substantially synchronously with the rotor disc, the method further comprising: causing the mechanical stop to encounter the brake system by contacting the rotor disc and the mechanical stop.

Various examples have been described. These and other examples are within the scope of the following claims.

What is claimed is:

1. An assembly comprising:
a wheel configured to rotate around a wheel axis;
a brake system comprising:
   a disc stack comprising a rotor disc and a stator disc, wherein the rotor disc is rotationally coupled to the wheel, and wherein the wheel is configured to rotate relative to the stator disc; and
   an actuator defining an actuator housing and configured to compress the disc stack,
   wherein the brake system is configured to compress the disc stack by limiting the linear movement of the disc stack by exerting a reaction force on the disc stack when the actuator compresses the disc stack, and
   wherein a portion of the brake system is configured to linearly deform when the brake system exerts the reaction force; and
a mechanical stop rotationally coupled to the wheel, wherein the mechanical stop is configured to reduce the reaction force exerted by the brake system when the linear deformation of the portion of the brake system causes the mechanical stop to encounter the brake system, such that the mechanical stop limits a linear displacement of the disc stack relative to the actuator housing.

2. The assembly of claim 1, wherein the mechanical stop is configured to encounter the disc stack when the mechanical stop encounters the brake system.

3. The assembly of claim 1, wherein the mechanical stop is configured to transmit at least a portion of the reaction force to the wheel.

4. The assembly of claim 1, wherein the mechanical stop is configured to maintain a displacement between the brake system and the wheel.

5. The assembly of claim 4, wherein the brake system includes a torque tube, wherein the wheel is configured to rotate relative to the torque tube, and wherein the mechanical stop is configured to maintain the displacement between the torque tube and the wheel.

6. The assembly of claim 1, further comprising a wheel component attached to the wheel, wherein the wheel component includes the mechanical stop.

7. The assembly of claim 6, wherein the wheel component is a rotor drive key.

8. The assembly of claim 1, wherein the mechanical stop includes a bearing surface defined by an interior surface of the wheel, wherein the bearing surface is configured to encounter the disc stack.

9. The assembly of claim 1, further comprising a backing plate configured to encounter the disc stack when the actuator compresses the disc stack, wherein the wheel is configured to rotate relative to the backing plate, and wherein the backing plate is configured to move in an axial direction of the wheel when the portion of the brake system linearly deforms.

10. The assembly of claim 1, wherein the brake system includes a torque tube configured to exert a portion of the reaction force, and wherein the mechanical stop is configured to reduce the portion of the reaction force exerted by the torque tube when the mechanical stop encounters the brake system and the actuator compresses the disc stack, such that the mechanical stop reduces the reaction force exerted by the brake system and limits the linear displacement of the disc stack relative to the actuator housing.

11. The assembly of claim 1, wherein:
the actuator is configured to compress the disc stack using a compression force,
the actuator defines a first length between the actuator and the mechanical stop in the absence of the compression force,
the actuator defines a second length between the actuator and the backing plate in the absence of the compression force, the first and second lengths being measured in a parallel direction, and
the first length is greater than the second length.

12. The assembly of claim 1, wherein the mechanical stop is configured to encounter a portion of the disc stack rotationally coupled to the wheel.

13. The assembly of claim 1, wherein the mechanical stop is configured to encounter a portion of the disc stack, and wherein the wheel is configured to rotate relative to the portion of the disc stack.

14. The assembly of claim 1, wherein the mechanical stop is configured to encounter a drive insert within a drive slot of the rotor disc.

15. An assembly comprising:
a wheel configured to rotate around a wheel axis;
a brake system comprising:
  a disc stack;
  a torque tube configured to engage the disc stack;
  a backing plate attached to the torque tube, wherein the backing plate is configured to limit movement of the disc stack in a direction parallel to the wheel axis; and
  an actuator configured to compress the disc stack against the backing plate using a compression force, wherein the backing plate is configured to exert a reaction force on the disc stack when the actuator compresses the disc stack; and
a mechanical stop configured to encounter the disc stack, wherein:
  the mechanical stop is configured to reduce the reaction force when the mechanical stop encounters the disc stack,
  the mechanical stop is configured to limit movement of the disc stack in the direction parallel to the wheel axis when the mechanical stop encounters the disc stack, such that the mechanical stop limits a linear displacement of the disc stack relative to the actuator,
  the mechanical stop is rotationally coupled to the wheel,
  the actuator defines a first length between the actuator and the mechanical stop in the absence of the compression force,
  the actuator defines a second length between the actuator and the backing plate in the absence of the compression force, the first and second lengths being measured in a direction parallel to the wheel axis, and
  the first length is greater than the second length.

16. The assembly of claim 15, wherein the mechanical stop is configured to encounter a portion of the disc stack rotationally coupled to the wheel.

17. The assembly of claim 15, wherein the mechanical stop is configured to transmit at least a portion of the reaction force to the wheel when the mechanical stop encounters the disc stack.

18. A method comprising:
compressing a disc stack of a brake system using an actuator of the brake system, wherein the disc stack includes a rotor disc rotationally coupled to a wheel and a stator disc, wherein the wheel is configured to rotate around a wheel axis, wherein the brake system exerts a reaction force on the disc stack when the actuator compresses the disc stack, and wherein a mechanical stop is configured to rotate substantially synchronously with the wheel; and
limiting the movement of the disc stack by reducing the reaction force exerted by the brake system by causing the brake system to encounter the mechanical stop using the compression of the disc stack by the actuator.

19. The method of claim 18, further comprising causing the mechanical stop to encounter the brake system by contacting the rotor disc.

20. The assembly of claim 1, wherein the portion of the brake system includes a torque tube configured to exert a portion of the reaction force, and wherein the mechanical stop is configured to reduce the portion of the reaction force exerted by the torque tube when a linear deformation of the torque tube causes the mechanical stop to encounter the brake system.

* * * * *